United States Patent
Ichimura

(10) Patent No.: US 11,942,103 B2
(45) Date of Patent: Mar. 26, 2024

(54) TRANSMISSION APPARATUS, TRANSMISSION METHOD, RECEPTION APPARATUS, AND RECEPTION METHOD FOR TRANSMITTING AND RECEIVING AN AUDIO SIGNAL INCLUDING A MIXED SIGNAL SIMULTANEOUSLY TRANSMITTED BY MIXING A COMPRESSED AUDIO SIGNAL AND A LINEAR PULSE CODE MODULATION SIGNAL

(71) Applicant: SONY CORPORATION, Tokyo (JP)

(72) Inventor: Gen Ichimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 17/049,177

(22) PCT Filed: May 15, 2019

(86) PCT No.: PCT/JP2019/019407
§ 371 (c)(1),
(2) Date: Oct. 20, 2020

(87) PCT Pub. No.: WO2019/225448
PCT Pub. Date: Nov. 28, 2019

(65) Prior Publication Data
US 2021/0249026 A1   Aug. 12, 2021

(30) Foreign Application Priority Data
May 23, 2018   (JP) ................. 2018-098382

(51) Int. Cl.
*G10L 19/113*   (2013.01)
*G06F 3/16*   (2006.01)
*H04N 21/4363*   (2011.01)

(52) U.S. Cl.
CPC ............ *G10L 19/113* (2013.01); *G06F 3/162* (2013.01); *H04N 21/43635* (2013.01)

(58) Field of Classification Search
CPC ........ G10L 19/113; G10L 19/00; G06F 3/162; H04N 21/43635; H04N 21/233; H04N 21/436; H04N 21/439; H04N 21/8106
See application file for complete search history.

(56) References Cited

U.S. PATENT DOCUMENTS 6,122,338 A * 9/2000 Yamauchi ............. H04L 1/0025
381/2
2003/0204277 A1   10/2003 Achariyakosol et al.
(Continued)

FOREIGN PATENT DOCUMENTS

| CN | 1495776 A | 5/2004 |
| CN | 103177725 A | 6/2013 |

(Continued)

OTHER PUBLICATIONS

Digital audio—Interface for non-linear PCM encoded audio bitstreams applying IEC 60958—Part 1: General, IEC 61937-1, Jan. 2007, pp. 1-21, IEC.
(Continued)

*Primary Examiner* — Michael N Opsasnick
(74) *Attorney, Agent, or Firm* — Paratus Law Group, PLLC

(57) ABSTRACT

The simultaneous transmission and reproduction of a compressed audio signal and a linear PCM signal is satisfactorily achieved. An audio signal of a predetermined unit is sequentially transmitted via a predetermined transmission line to a reception side. The audio signal of the predetermined unit is a mixed signal of a compressed audio signal and a linear PCM signal. For example, the audio signal of the predetermined unit is an audio signal of a sub-frame unit. In this case, for example, in the audio signal of the sub-frame unit, (Continued)

the compressed audio signal is arranged on an upper-order bit side, and the linear PCM signal is arranged on a lower-order bit side.

16 Claims, 24 Drawing Sheets

(56) References Cited

U.S. PATENT DOCUMENTS

| | | | |
|---|---|---|---|
| 2004/0028126 A1* | 2/2004 | Inokuchi | G10L 19/008 375/240 |
| 2006/0133777 A1 | 6/2006 | Yamamoto et al. | |
| 2006/0232451 A1* | 10/2006 | Saito | H04N 19/12 375/E7.206 |
| 2006/0233446 A1* | 10/2006 | Saito | H04N 19/176 375/E7.184 |
| 2007/0244587 A1* | 10/2007 | Yamamoto | H03G 3/002 381/104 |
| 2011/0280307 A1* | 11/2011 | MacInnis | H04N 5/14 375/240.15 |
| 2012/0081604 A1* | 4/2012 | Hosokawa | H04N 21/4341 348/E5.009 |
| 2017/0302633 A1* | 10/2017 | Ichimura | H04L 63/0428 |
| 2018/0054634 A1 | 2/2018 | Tsukagoshi | |
| 2019/0005968 A1 | 1/2019 | Ichimura | |
| 2021/0242879 A1* | 8/2021 | Ichimura | H04N 21/436 |
| 2022/0059109 A1* | 2/2022 | Ichimura | G06F 3/16 |

FOREIGN PATENT DOCUMENTS

| | | | |
|---|---|---|---|
| JP | 2009-033649 A | 2/2009 | |
| JP | 2009-130606 A | 6/2009 | |
| WO | WO-2016052187 A1 * | 4/2016 | G10L 19/00 |
| WO | WO 2017/010358 A1 | 1/2017 | |
| WO | WO 2017/043378 A1 | 3/2017 | |

OTHER PUBLICATIONS

Yoshio, Chapter 8: International Standardization of Digital Audio Interface Standards, Feb. 23, 2009, pp. 1-42.

* cited by examiner

FIG. 5

HDMI PIN ASSIGNMENT (CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG. 11

| PREAMBLE | CHANNEL CODING | | |
|---|---|---|---|
| "B" | 11101000 | 00010111 | SUB-FRAME #1, BLOCK STARTS |
| "M" | 11100010 | 00011101 | SUB-FRAME #1 |
| "W" | 11100100 | 00011011 | SUB-FRAME #2 |
| | 0 | 1 | |
| | (MOST RECENT STATE) | | |

FIG. 14

| | 0<br>a="0" | 1<br>b="1" | 2<br>c | 3 | 4<br>d="100" | 5 | 6 | 7<br>Mode="00" |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | 49 | 50<br>Multichannel Configuration Type:<br>"0 0 0 0": No information<br>"1 1 1 1": IEC 61937-1 configuration | 51 | 52 | 53 | 54 | 55 |
| 7 | 56 | 57<br>Multichannel configuration value (MCV) | 58 | 59 | 60 | | Multichannel configuration value (MCV) | |
| ... | | | | ... | | | | |
| 21 | | | | | | | | |
| 22 | | | | | | | | |
| 23 | | | | | | | | 191 |

FIG. 15

| Multichannel configuration value (MCV) | configuration |
|---|---|
| 00000000 | No information |
| 10000000 | 8-bit LPCM 2 channel |
| 01000000 | 8-bit LPCM Stereo 2 channels |
| 00100000 | 16-bit LPCM 1 channel |
| 10100000 | 16-bit LPCM 2 channels |
| 01100000 | 16-bit LPCM Stereo 2 channels |
| 11100000 | 16-bit LPCM 4 channels |

FIG. 18

| IEC 60958-1 preamble | IEC 60958-1 channel | AUDIO CHANNEL | STREAM |
|---|---|---|---|
| B | 1 | L ch | 2ch LPCM |
| W | 2 | R ch | |
| M | 1 | L ch | 5.1ch LPCM |
| W | 2 | R ch | |
| M | 1 | C ch | |
| W | 2 | LFE ch | |
| M | 1 | Ls ch | |
| W | 2 | Rs ch | |
| M | 1 | L ch | 2ch LPCM |
| W | 2 | R ch | |

FIG. 19

| | | | |
|---|---|---|---|
| IU 1 | 1 (Start) | Q | CRC |
| IU 2 | 1 (Start) | Q | CRC |
| IU 3 | 1 (Start) | Q | IEC 61937-1 ID |
| IU 4 | 1 (Start) | Q | IEC 61937-1 ID / Byte 1 |
| IU 5 | 1 (Start) | Q | Byte 1 / Byte 2 |
| IU 6 | 1 (Start) | Q | Byte 2 / Byte 3 |
| IU 7 | 1 (Start) | Q | Byte 3 / Byte 4 |
| IU 8 | 1 (Start) | Q | Byte 4 / 0 |
| IU 9 | 1 (Start) | Q | 0 0 0 |
| IU 10 | 1 (Start) | Q | 0 0 0 |

FIG. 20

| IEC 61937-1 ID | | |
|---|---|---|
| 10000000: LANGUAGE | Byte 1 | ASCII CHARACTER (ISO 639) |
| | Byte 2 | ASCII CHARACTER (ISO 639) |
| | Byte 3 | ASCII CHARACTER (ISO 639) |
| | Byte 4 | ASCII CHARACTER (ISO 639) |
| 01000000: REPRODUCTION SPEAKER POSITION | Byte 1 | CHANNEL NUMBER |
| | Byte 2 | ANGLE (IEC 62574) |
| | Byte 3 | HEIGHT (IEC 62574) |
| | Byte 4 | DISTANCE (IEC 62574) |

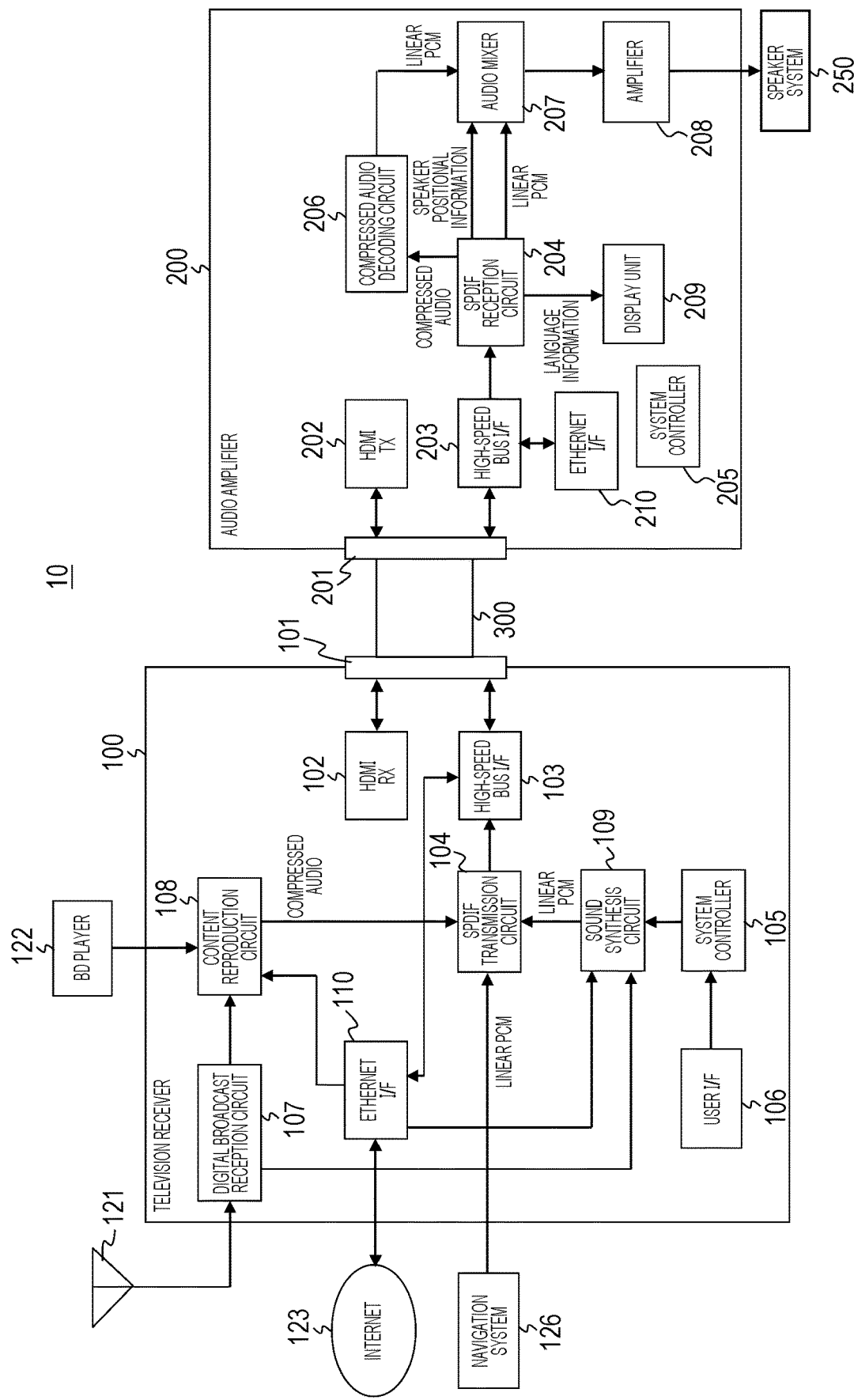

TRANSMISSION APPARATUS, TRANSMISSION METHOD, RECEPTION APPARATUS, AND RECEPTION METHOD FOR TRANSMITTING AND RECEIVING AN AUDIO SIGNAL INCLUDING A MIXED SIGNAL SIMULTANEOUSLY TRANSMITTED BY MIXING A COMPRESSED AUDIO SIGNAL AND A LINEAR PULSE CODE MODULATION SIGNAL

CROSS REFERENCE TO PRIOR APPLICATION

This application is a National Stage patent application of PCT International Patent Application No. PCT/JP2019/019407 (filed on May 15, 2019) under 35 U.S.C. § 371, which claims priority to Japanese Patent Application No. 2018-098382 (filed on May 23, 2018), which are all hereby incorporated by reference in their entirety.

TECHNICAL FIELD

The present technology relates to a transmission apparatus, a transmission method, a reception apparatus, and a reception method.

BACKGROUND ART

The transmission of a linear PCM signal according to IEC 60958 as a digital audio interface has been widely used. For example, Patent Document 1 includes a description relating to IEC 60958. Furthermore, IEC 61937 according to which a compressed audio signal is transmitted on the IEC 60958 protocol has also spread, and is used in various types of audio codec transmission.

These have been commercially used by mapping the IEC 60958 protocol to the formats of a coaxial terminal and an optical out terminal that are called Sony Philips Digital Interface (SPDIF) in actual products, and High-Definition Multimedia Interface (HDMI), Mobile High-definition Link (MHL), and DisplayPort that are a multimedia interface including a video.

CITATION LIST

Patent Document
Patent Document 1: Japanese Patent Application Laid-Open No. 2009-130606

SUMMARY OF THE INVENTION

Problems to be Solved by the Invention

In a case where a television receiver serves as a transmitter and an audio amplifier serves as a receiver/reproduction machine, only a sound portion of content displayed on a screen of the television receiver has been transmitted to the audio amplifier, and has been reproduced. In the content, normally, a compressed audio codec is used, and a technology, such as multiple channels or object audio, that enables high-quality reproduction has been developed. These codecs require large digital signal processor (DSP) performance for decoding, or require the arrangement of a large number of speakers having 5.1 channels or the like.

Therefore, a heavy load is applied in decoding and reproduction inside the television receiver. Thus, it has been normal that the sound portion in a compressed form is transmitted to the audio amplifier via the digital audio interface and reproduction is left to the audio amplifier. The form of content has been increasing, and content is received in a broadcast, a medium such as a Blu-ray disc is reproduced and content is input to the television receiver, or content is streaming-distributed or downloaded via the Internet.

On the other hand, it is not only in the reproduction of content that sound needs to be reproduced inside the television receiver. A real-time property is required in comparison with the reproduction of content in many cases, for example, response sound of a user interface such as a remote controller, artificial-sound synthesized sound generated by an artificial intelligence (AI) function or a navigation function, coping with multiple languages (content originally includes a plurality of languages, real-time translation is performed on the Internet, inside the television receiver, or the like), and the like. In these cases, a linear PCM signal is transmitted, and a delay caused by decoding is avoided. A similar situation occurs in digital audio transmission between on-vehicle devices in a vehicle.

Here, if reproduction is performed while the transmission of a compressed audio signal and the transmission of a linear PCM signal are sequentially switched, the reproduction of content remarkably loses continuity, and reproduction quality deteriorates. A method for decoding a compressed audio signal, mixing the decoded signal with a linear PCM signal, and transmitting the signals has been proposed. However, the television receiver does not have a function of decoding all of the compressed audio signals. Moreover, a delay occurs in a course of decoding and mixing, and therefore, in some cases, this method is not preferable in an application that requires the real-time property described above. For example, in the case of game content, background music is provided according to MPEG-4 AAC. However, if a linear PCM signal or the like that serves as a response to an operation performed on a game controller by a user is delayed, the user fails to comfortably play a game.

Stated another way, the problem is that a digital audio interface method and an apparatus have not been provided that can achieve the simultaneous transmission and reproduction of a compressed audio signal and a linear PCM signal. For this reason, for example, only a linear PCM signal is reproduced from a low-quality speaker inside a television receiver, but the quality of a user's experience remarkably deteriorates. Furthermore, if a plurality of digital audio interfaces is included, and a compressed audio signal and a linear PCM signal are transmitted to separate audio amplifiers and are reproduced, this problem can be solved. However, a cost increases, the setting of devices becomes more complicated, and a system is not readily available to general users.

It is an object of the present technology to satisfactorily achieve the simultaneous transmission and reproduction of a compressed audio signal and a linear PCM signal.

Solutions to Problems

A concept of the present technology is:
a transmission apparatus including:
a transmission unit that sequentially transmits an audio signal of a predetermined unit via a predetermined transmission line to a reception side,
in which the audio signal of the predetermined unit includes a mixed signal of a compressed audio signal and a linear PCM signal.

In the present technology, the transmission unit sequentially transmits the audio signal of the predetermined unit via the predetermined transmission line to the reception side. For example, the predetermined transmission line may be a coaxial cable, an optical cable, an Ethernet (IEC 61883-6) cable, an HDMI cable, an MHL cable, or a DisplayPort cable.

The audio signal of the predetermined unit is a mixed signal of a compressed audio signal and a linear PCM signal. For example, the linear PCM signal may be an audio signal that requires real-time property. Furthermore, for example, a first acquisition unit that acquires the compressed audio signal and a second acquisition unit that acquires the linear PCM signal may be further included.

Furthermore, for example, the audio signal of the predetermined unit may be an audio signal of a sub-frame unit. In this case, for example, in the audio signal of the sub-frame unit, the compressed audio signal may be arranged on an upper-order bit side, and the linear PCM signal may be arranged on a lower-order bit side.

As described above, in the present technology, an audio signal of a predetermined unit serving as a mixed signal of a compressed audio signal and a linear PCM signal is sequentially transmitted via a predetermined transmission line to a reception side. Therefore, the simultaneous transmission of a compressed audio signal and a linear PCM signal can be satisfactorily achieved.

Note that in the present technology, for example, an information addition unit may be further included that adds identification information to the audio signal to be transmitted by the transmission unit, the identification information indicating that the audio signal of the predetermined unit is the mixed signal of the compressed audio signal and the linear PCM signal. In this case, for example, the information addition unit may add the identification information by using a predetermined bit area of a channel status of each block that is configured for a predetermined number of the predetermined units. As described above, by adding the identification information, the reception side can easily recognize that the audio signal of the predetermined unit is the mixed signal of the compressed audio signal and the linear PCM signal.

Furthermore, in the present technology, for example, an information addition unit may be further included that adds configuration information to the audio signal to be transmitted by the transmission unit, the configuration information indicating a configuration of the linear PCM signal. In this case, for example, the information addition unit may add the configuration information by using a predetermined bit area of a channel status of each block that is configured for a predetermined number of the predetermined units. As described above, by adding the configuration information, the reception side can easily recognize the configuration of the linear PCM signal.

Furthermore, in the present technology, for example, an information addition unit may be further included that adds information relating to the linear PCM signal to the audio signal to be transmitted by the transmission unit. In this case, for example, the information addition unit may add the information relating to the linear PCM signal by using user data bits of a predetermined number of the predetermined units that are consecutive. As described above, by adding the information relating to the linear PCM signal, the reception side can appropriately process the linear PCM signal.

Furthermore, another concept of the present technology is:
a reception apparatus including:
a reception unit that sequentially receives an audio signal of a predetermined unit via a predetermined transmission line from a transmission side,
in which the audio signal of the predetermined unit includes a mixed signal of a compressed audio signal and a linear PCM signal.

In the present technology, the reception unit sequentially receives the audio signal of the predetermined unit via the predetermined transmission line from the transmission side. The audio signal of the predetermined unit is a mixed signal of a compressed audio signal and a linear PCM signal. For example, a processing unit may be further included that processes the compressed audio signal and the linear PCM signal and obtains an output linear PCM signal.

As described above, in the present technology, an audio signal of a predetermined unit serving as a mixed signal of a compressed audio signal and a linear PCM signal is sequentially received via a predetermined transmission line from a transmission side. Therefore, the simultaneous reproduction of a compressed audio signal and a linear PCM signal can be satisfactorily achieved.

Note that, in the present technology, for example, configuration information may have been added to the audio signal received by the reception unit, the configuration information indicating a configuration of the linear PCM signal, and the processing unit may process the linear PCM signal on the basis of the configuration information. This enables the processing unit to appropriately process a linear PCM signal in accordance with a configuration of this linear PCM signal.

Furthermore, in the present technology, for example, information relating to the linear PCM signal may have been added to the audio signal received by the reception unit, and the processing unit may process the linear PCM signal on the basis of this information. This enables the processing unit to appropriately process a linear PCM signal on the basis of the information relating to this linear PCM signal.

Effects of the Invention

According to the present technology, the simultaneous transmission and reproduction of a compressed audio signal and a linear PCM signal can be satisfactorily achieved. Note that effects described herein are only illustrative and are not restrictive, and additional effects may be exhibited.

BRIEF DESCRIPTION OF DRAWINGS

FIG. 5 is a diagram illustrating pin assignment of an HDMI connector.

FIG. 11 is a diagram illustrating channel coding of a preamble according to the IEC 60958 standard.

FIG. 14 is a diagram schematically illustrating a format of a channel status in a case where a compressed audio signal and a linear PCM signal are simultaneously transmitted.

FIG. 15 is a diagram illustrating an example of a correspondence relationship between a value of a "multichannel configuration value (MCV)" and a configuration of a linear PCM signal.

FIG. 18 is a diagram illustrating an example of a frame configuration in a case where a stereo 2-channel linear PCM signal and a 5.1-channel linear PCM signal are transmitted.

FIG. 19 is a diagram illustrating an example of a user data message.

FIG. 20 is a diagram illustrating an example of information relating to a linear PCM signal.

FIG. 24 is a block diagram illustrating a configuration example in a case where a navigation system is connected to the television receiver and is used.

MODE FOR CARRYING OUT THE INVENTION

A mode for carrying out the invention (hereinafter referred to as an "embodiment") is described below. Note that description will be provided in the order described below.

1. Embodiment
2. Variations

1. Embodiment

[Configuration Example of AV System]

Figure 1:
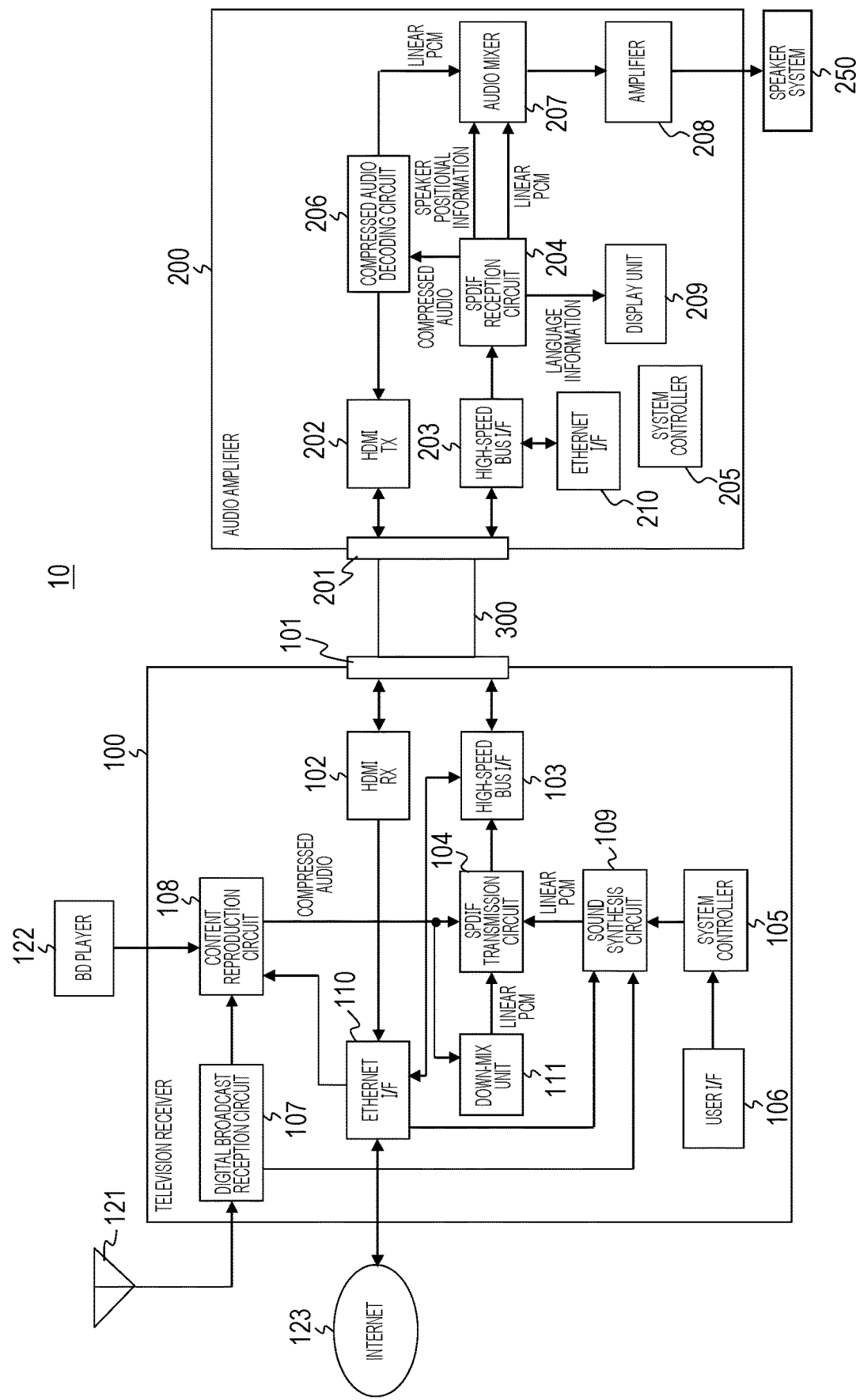
FIG. 1 is a block diagram illustrating a configuration example of an AV system serving as an embodiment.

FIG. 1 illustrates a configuration example of an AV system 10 serving as an embodiment. This AV system 10 includes a television receiver 100 and an audio amplifier 200. The television receiver 100 is connected to a reception antenna 121 for a television broadcast, a Blu-ray disc (BD) player 122, and the Internet 123. Furthermore, the audio amplifier 200 is connected to a speaker system 250 for 2 channels or for multiple channels. Note that "Blu-ray" is a registered trademark.

The television receiver 100 and the audio amplifier 200 are connected via an HDMI cable 300. Note that "HDMI" is a registered trademark. The television receiver 100 is provided with an HDMI terminal 101 that is connected to an HDMI reception unit (HDMI RX) 102 and a high-speed bus interface 103 that configures a communication unit. The audio amplifier 200 is provided with an HDMI terminal 201 that is connected to an HDMI transmission unit (HDMI TX) 202 and a high-speed bus interface 203 that configures a communication unit. One end of the HDMI cable 300 is connected to the HDMI terminal 101 of the television receiver 100, and another end of the HDMI cable 300 is connected to the HDMI terminal 201 of the audio amplifier 200.

The television receiver 100 includes the HDMI reception unit 102, the high-speed bus interface 103, and an SPDIF transmission circuit 104. Furthermore, the television receiver 100 includes a system controller 105, a user interface 106, a digital broadcast reception circuit 107, a content reproduction circuit 108, a sound synthesis circuit 109, an Ethernet interface 110, and a down-mix unit 111. Note that "Ethernet" is a registered trademark. Furthermore, in the illustrated example, respective units of an image system are appropriately omitted for simplification of description.

The system controller 105 controls operations of respective units of the television receiver 100. The user interface 106 is connected to the system controller 105. This user interface 106 configures an operation unit that a user uses to perform various operations, and includes, for example, a gesture input unit that detects an input of an instruction by using a remote controller, a touch panel, a mouse, a keyboard, or a camera, a sound input unit that inputs an instruction by using sound, and the like.

The digital broadcast reception circuit 107 processes a television broadcast signal that has been input from the reception antenna 121, and outputs a compressed audio signal relating to broadcast content. The Ethernet interface 110 performs communication with another server via the Internet 123. The content reproduction circuit 108 selectively extracts a compressed audio signal of broadcast content that has been obtained by the digital broadcast reception circuit 107, a compressed audio signal of reproduction content that has been supplied from the BD player 122, or a compressed audio signal of Internet content that has been obtained by the Ethernet interface 110, and transmits the extracted compressed audio signal to the SPDIF transmission circuit 104.

The sound synthesis circuit 109 receives, from the system controller 105, operation sound data that corresponds to an operation performed on the user interface 106, generates a linear PCM signal of operation sound, and transmits the linear PCM signal to the SPDIF transmission circuit 104. Such a linear PCM signal of operation sound requires a real-time property. Furthermore, the sound synthesis circuit 109 receives, from the system controller 105, reporting sound data that reports to a user that an email has been received, generates a linear PCM signal of reporting sound, and transmits the linear PCM signal to the SPDIF transmission circuit 104.

Furthermore, the sound synthesis circuit 109 receives subtitles data from the digital broadcast reception circuit 107, generates a liner PCM signal of subtitles sound by using subtitles reading software, and transmits the linear PCM signal to the SPDIF transmission circuit 104. Such a linear PCM signal of subtitles sound requires a real-time property. Examples include a case where broadcast content is a foreign movie, a language of sound indicated by a compressed audio signal is a foreign language, and subtitles are Japanese subtitles, and other cases. Note that, with regard to this subtitles sound, the similar is applied to a case where subtitles data relating to reproduction content from the BD player 122 rather than broadcast content is present.

Furthermore, the sound synthesis circuit 109 receives text data of translation sound that the Ethernet interface 110 has received from a translation server (not illustrated in FIG. 1), generates a linear PCM signal of the translation sound, and transmits the linear PCM signal to the SPDIF transmission circuit 104.

Here, the Ethernet interface 110 receives, for example, a PCM sound signal of lines in a first language that has been obtained by the compressed audio decoding circuit 206 described later of the audio amplifier 200, via the HDMI transmission unit 202 of the audio amplifier 200 and the HDMI reception unit 102 of the television receiver 100, and transmits this PCM sound signal of the lines in the first language to the translation server, and therefore the Ethernet interface 110 receives, from the translation server, text data of translation sound of lines in a second language.

The down-mix unit 111 performs decoding and down-mixing processing on a multichannel compressed audio signal that has been extracted by the content reproduction circuit 108 to generate a stereo 2-channel linear PCM signal, and transmits the generated signal to the SPDIF transmission circuit 104. This enables the multichannel compressed audio signal and the stereo 2-channel linear PCM signal to be simultaneously transmitted from the SPDIF transmission circuit 104. In this case, which signal will be reproduced is left to a reception side. This is effective in a case where respective reproduction devices having different reproduction performance are present in a plurality of rooms, although the illustrated example only indicates the audio amplifier 200 as a reproduction device on the reception side.

The HDMI reception unit 102 receives data of an image or sound that has been supplied to the HDMI terminal 101 via the HDMI cable 300 through communication conforming to HDMI. The high-speed bus interface 103 is an interface of a bidirectional communication path that is configured by using a reserve line and a hot plug detect (HPD) line that configure the HDMI cable 300. Note that details of the HDMI reception unit 102 and the high-speed bus interface 103 will be described later.

The SPDIF transmission circuit 104 is a circuit for transmitting a digital audio transmission signal according to the IEC 60958 standard (hereinafter appropriately referred to as an "SPDIF signal"). This SPDIF transmission circuit 104 is a transmission circuit that conforms to the IEC 60958 standard. In this embodiment, the SPDIF transmission circuit 104 simultaneously transmits a compressed audio signal and a linear PCM signal. In this case, an audio signal of a sub-frame unit is a mixed signal of a compressed audio signal and a linear PCM signal.

At this time, identification information indicating that an audio signal of a sub-frame unit is a mixed signal of a compressed audio signal and a linear PCM signal, configuration information indicating the configuration of the linear PCM signal, information relating to the linear PCM signal, or the like is added to an SPDIF signal to be transmitted from this SPDIF transmission circuit 104. The configuration information indicates, for example, a 2-channel configuration of an 8-bit linear PCM signal, a stereo 2-channel configuration of an 8-bit linear PCM signal, a 1-channel configuration of a 16-bit linear PCM signal, or the like. Furthermore, the information relating to the linear PCM signal is, for example, information such as a language or a speaker position. Note that details of the SPDIF signal will be described later.

The audio amplifier 200 includes the HDMI transmission unit 202, the high-speed bus interface 203, and an SPDIF reception circuit 204. Furthermore, the audio amplifier 200 includes a system controller 205, the compressed audio decoding circuit 206, an audio mixer 207, an amplifier 208, a display unit 209, and an Ethernet interface 210.

The system controller 205 controls operations of respective units of the audio amplifier 200. The HDMI transmission unit 202 transmits data of a video (an image) and sound in a baseband from the HDMI terminal 201 to the HDMI cable 300 through communication conforming to HDMI. The high-speed bus interface 203 is an interface of a bidirectional communication path that is configured by using a reserve line and a hot plug detect (HPD) line that configure the HDMI cable 300. Note that details of the HDMI transmission unit 202 and the high-speed bus interface 203 will be described later. The SPDIF reception circuit 204 is a circuit for receiving an SDPIF signal (a digital audio signal according to the IEC 60958 standard). This SPDIF reception circuit 204 is a reception circuit that conforms to the IEC 60958 standard.

The compressed audio decoding circuit 206 performs decoding processing on a compressed audio signal obtained by the SPDIF reception circuit 204, and obtains a 2-channel or multichannel linear PCM signal. The audio mixer 207 mixes the linear PCM signal obtained by the compressed audio decoding circuit 206 with the linear PCM signal obtained by the SPDIF reception circuit 204 on the basis of configuration information indicating the configuration of a linear PCM signal, and obtains a 2-channel or multichannel output linear PCM signal. Note that the mixing processing described here also includes only selecting either. Furthermore, in a case where linear PCM signals of a plurality of channels are transmitted, the mixing processing described here also includes selecting any of the linear PCM signals.

Here, the audio mixer 207 performs rendering processing to obtain a PCM sound signal of a channel that corresponds to the configuration of the speaker system 250. Furthermore, in a case where, for example, speaker positional information has been added as information relating to a linear PCM signal to the linear PCM signal obtained by the SPDIF reception circuit 204, rendering processing is performed in such a way that sound indicated by the linear PCM signal is localized in a speaker position of the speaker positional information. The amplifier 208 amplifies the 2-channel or multichannel output linear PCM signal that has been obtained by the audio mixer 207, and supplies the 2-channel or multichannel output linear PCM signal to the speaker system 250.

Figure 2:
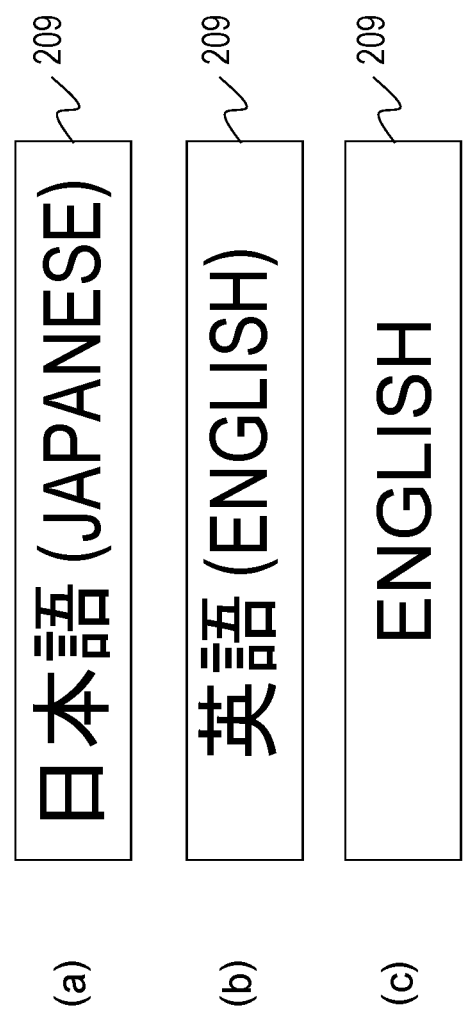
FIG. 2 is a diagram illustrating an example of a display of a language name on a display unit of an audio amplifier.

The display unit 209 displays a state of the audio amplifier 200, and the like. For example, when the linear PCM signal from the compressed audio decoding circuit 206 is in a first language and the linear PCM signal obtained by the SPDIF circuit 204 is in a second language, the audio mixer 207 selects either of the linear PCM signals, and the name of a language relating to the selected linear PCM signal is displayed on the display unit 208. Here, language information of the linear PCM signal from the compressed audio decoding circuit 206 has been embedded into a compressed audio signal itself, but language information of the linear PCM signal obtained by the SPDIF circuit 204 has been added to an audio signal received by this SPDIF reception circuit 204. FIGS. 2(a), 2(b), and 2(c) illustrate an example of a display of a language name on the display unit 209.

"Configuration Example of HDMI Transmission Unit/Reception Unit"

Figure 3:
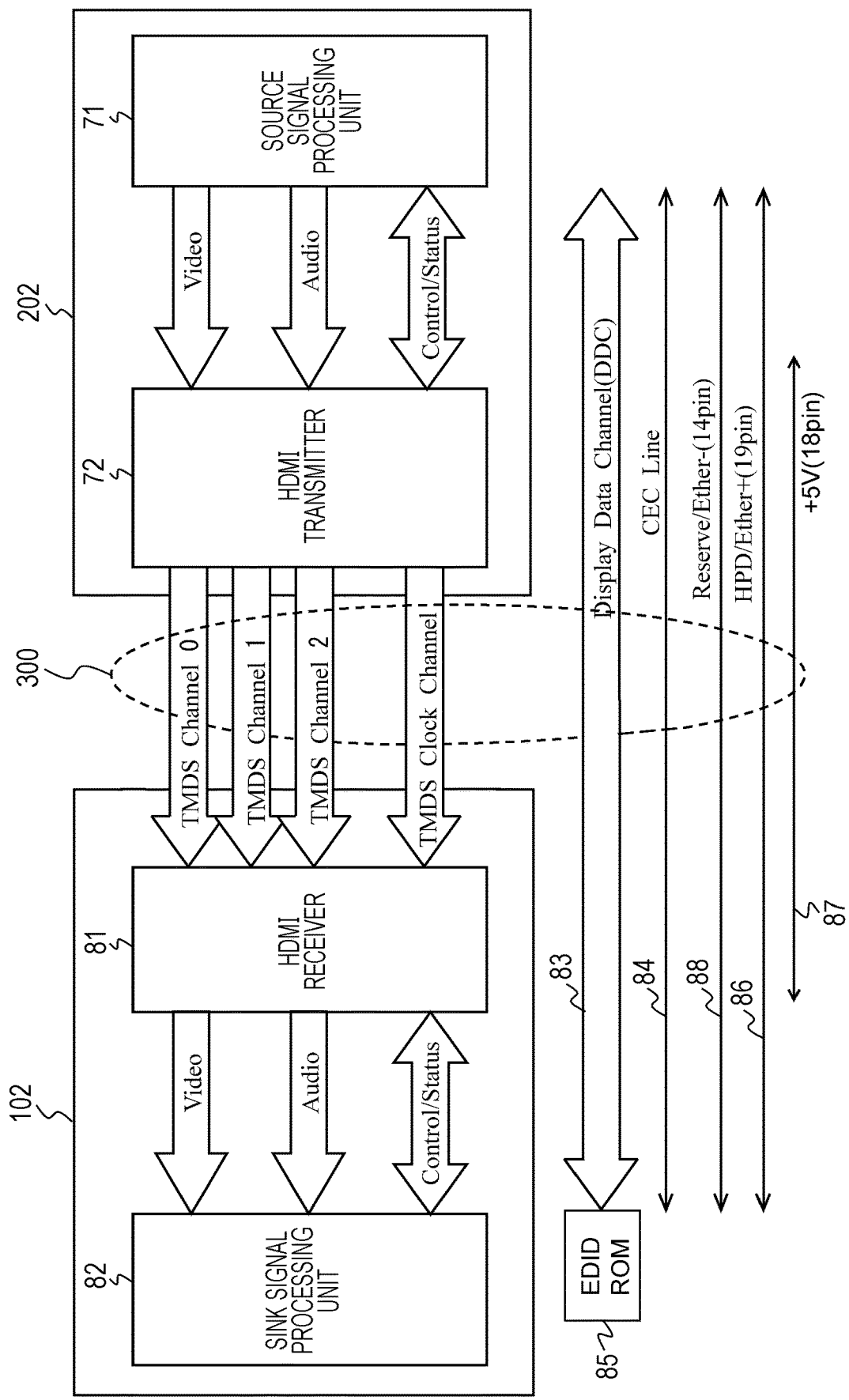
FIG. 3 is a block diagram illustrating configuration examples of an HDMI reception unit of a television receiver and an HDMI transmission unit of the audio amplifier.

FIG. 3 illustrates configuration examples of the HDMI reception unit 102 of the television receiver 100 and the HDMI transmission unit 202 of the audio amplifier 200 in the AV system 10 of FIG. 1.

During a valid image period (hereinafter appropriately referred to as an "active video period") that is a period obtained by excluding a horizontal blanking interval and a vertical blanking interval from a period from a certain vertical synchronizing signal to the next vertical synchronizing signal (hereinafter appropriately referred to as a "video field"), the HDMI transmission unit 202 transmits a differential signal of baseband (uncompressed) image data for one screen to the HDMI reception unit 102 through a plurality of channels in one direction. Furthermore, during the horizontal blanking interval and the vertical blanking interval, the HDMI transmission unit 202 transmits differential signals that correspond to sound data and a control packet that accompany image data, other auxiliary data, and the like, to the HDMI reception unit 102 through a plurality of channels in one direction.

The HDMI transmission unit 202 includes a source signal processing unit 71 and an HDMI transmitter 72. The source signal processing unit 71 is supplied with baseband uncompressed data of an image (a video) and sound (audio). The source signal processing unit 71 performs required processing on the supplied data of the image and the sound, and supplies the data to the HDMI transmitter 72. Furthermore, the source signal processing unit 71 communicates information for control, information reporting a status (Control/Status), or the like with the HDMI transmitter 72, as needed.

The HDMI transmitter 72 converts image data supplied from the source signal processing unit 71 into a corresponding differential signal, and transmits the differential signal to the HDMI reception unit 102 that is connected via the HDMI cable 300, through three TMDS channels #0, #1, and #2 serving as a plurality of channels in one direction.

Moreover, auxiliary data of sound data and a control packet that accompany uncompressed image data, and the like, and control data of a vertical synchronizing signal (VSYNC), a horizontal synchronizing signal (HSYNC), and the like that have been supplied from the transmitter 72 and the source signal processing unit 71 are converted into corresponding differential signals, and the differential signals are transmitted to the HDMI reception unit 102 that is connected via the HDMI cable 300, through three TMDS channels #0, #1, and #2 in one direction.

Furthermore, the transmitter 72 transmits a pixel clock that has been synchronized with image data to be transmitted through the three TMDS channels #0, #1, and #2, through a TMDS clock channel to the HDMI reception unit 102 that is connected via the HDMI cable 300.

The HDMI reception unit 102 receives the differential signal that has been transmitted from the HDMI transmission unit 202 through the plurality of channels in one direction and corresponds to the image data during the active video period, and also receives the differential signal that has been transmitted from the HDMI transmission unit 202 through the plurality of channels and corresponds to the auxiliary data or the control data during the horizontal blanking interval and the vertical blanking interval.

The HDMI reception unit 102 includes an HDMI receiver 81 and a sink signal processing unit 82. The HDMI receiver 81 receives the differential signal that has been transmitted from the HDMI transmission unit 202 connected via the HDMI cable 300, through the TMDS channels #0, #1, and #2 in one direction and corresponds to the image data, and the differential signal that corresponds to the auxiliary data or the control data in synchronization with the pixel clock that has been similarly transmitted from the HDMI transmission unit 202 through the TMDS clock channel. Moreover, the HDMI receiver 81 converts the differential signals into the image data, the auxiliary data, and the control data that correspond to the differential signals, and supplies the image data, the auxiliary data, and the control data to the sink signal processing unit 82, as needed.

The sink signal processing unit 82 performs required processing on data supplied from the HDMI receiver 81, and outputs the data. In addition, the sink signal processing unit 82 communicates information for control, information reporting a status (Control/Status), or the like with the HDMI receiver 81, as needed.

Transmission channels according to HDMI include the three TMDS channels #0, #1, and #2 for serially transmitting image data, auxiliary data, and control data from the HDMI transmission unit 202 to the HDMI reception unit 102 in one direction in synchronization with a pixel clock, the TMDS clock channel serving as a transmission channel for transmitting the pixel clock, a display data channel (DDC) 83, and a transmission channel called a CEC line 84.

The DDC 83 includes two not-illustrated lines (signal lines) that are included in the HDMI cable 300, and is used for a source device to read enhanced-extended display identification (E-EDID) from a sink device that is connected via the HDMI cable 300. Stated another way, the sink device includes an EDID ROM 85. The source device reads the E-EDID stored by the EDID ROM 85, via the DDC 83 from the sink device connected via the HDMI cable 300, and recognizes the setting and performance of the sink device on the basis of the E-EDID.

The CEC line 84 includes one not-illustrated line that is included in the HDMI cable 300, and is used to perform bidirectional communication of data for control between the source device and the sink device.

Furthermore, the HDMI cable 300 includes a line 86 that is connected to a pin called hot plug detect (HPD). The source device can detect connection of the sink device, by using the line 86. Furthermore, the HDMI cable 300 includes a line 87 that is used to supply power from the source device to the sink device. Moreover, the HDMI cable 300 includes a reserve line 88.

Figure 4:
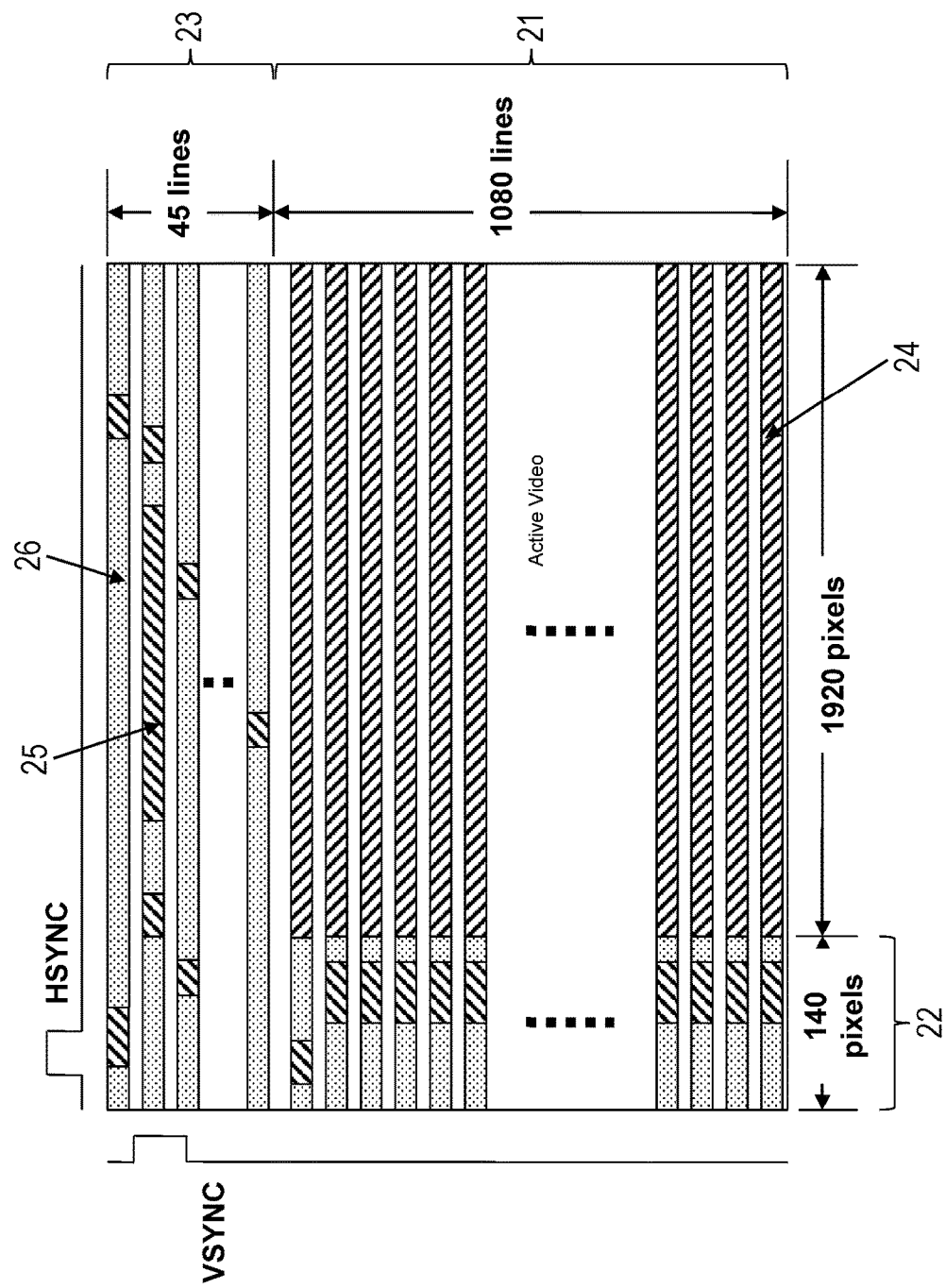
FIG. 4 is a diagram illustrating periods of various types of transmission data in a case where image data in which width×height is 1920 pixels×1080 lines is transmitted through a TMDS channel.

FIG. 4 illustrates periods of various types of transmission data in a case where image data in which width×height is 1920 pixels×1080 lines is transmitted through a TMDS channel. A video field in which transmission data is transmitted through three TMDS channels according to HDMI includes three periods, a video data period 24, a data island period 25, and a control period 26 in accordance with the type of transmission data.

Here, the video field period is a period from an active edge of a certain vertical synchronizing signal to an active edge of the next vertical synchronizing signal, and is divided into a horizontal blanking interval 22 (horizontal blanking), a vertical blanking interval 23 (vertical blanking), and an active pixel period 21 (active video) serving as a period obtained by excluding the horizontal blanking interval and the vertical blanking interval from the video field period.

The video data period 24 is allocated to the active pixel period 21. During this video data period 24, data of an active pixel of 1920 pixels×1080 lines that configures uncompressed image data for one screen is transmitted. The data island period 25 and the control period 26 are allocated to the horizontal blanking interval 22 and the vertical blanking interval 23. During the data island period 25 and the control period 26 that are described above, auxiliary data is transmitted.

Stated another way, the data island period 25 is allocated to portions of the horizontal blanking interval 22 and the vertical blanking interval 23. During this data island period 25, data that does not relate to control from among auxiliary data, for example, a packet of sound data, and the like, is transmitted. The control period 26 is allocated to other portions of the horizontal blanking interval 22 and the vertical blanking interval 23. During this control period 26, data that relates to control from among the auxiliary data, for example, a vertical synchronizing signal, a horizontal synchronizing signal, a control packet, and the like, is transmitted.

FIG. 5 illustrates pin assignment of an HDMI connector. This pin assignment is an example of type-A. Two lines serving as differential lines through which TMDS Data #i+ and TMDS Data #i− serving as differential signals of TMDS channel #i are transmitted are connected to pines (pins respectively having pin nos. 1, 4, and 7) to which TMDS Data #i+ has been assigned, and pins (pins respectively having pin nos. 3, 6, and 9) to which TMDS Data #i− has been assigned.

Furthermore, the CEC line 84 through which a CEC signal serving as data for control is transmitted is connected to a pin having pin no. 13, and a pin having pin no. 14 is a reserved pin. Furthermore, a line through which a serial data (SDA) signal, such as E-EDID, is transmitted is connected to a pin having pin no. 16, and a line through which a serial clock (SCL) signal serving as a clock signal to be used in synchronization at the time of transmission or reception of the SDA signal is connected to a pin having pin no. 15. The DDC 83 described above is configured by the line through which the SDA signal is transmitted and the line through which the SCL signal is transmitted.

Furthermore, the HPD line 86 that is used for the source device to detect connection of the sink device, as described above, is connected to a pin having pin no. 19. Furthermore, the power line 87 that is used to supply power, as described above, is connected to a pin having pin no. 18.

"Configuration Example of High-Speed Bus Interface"

Figure 6:
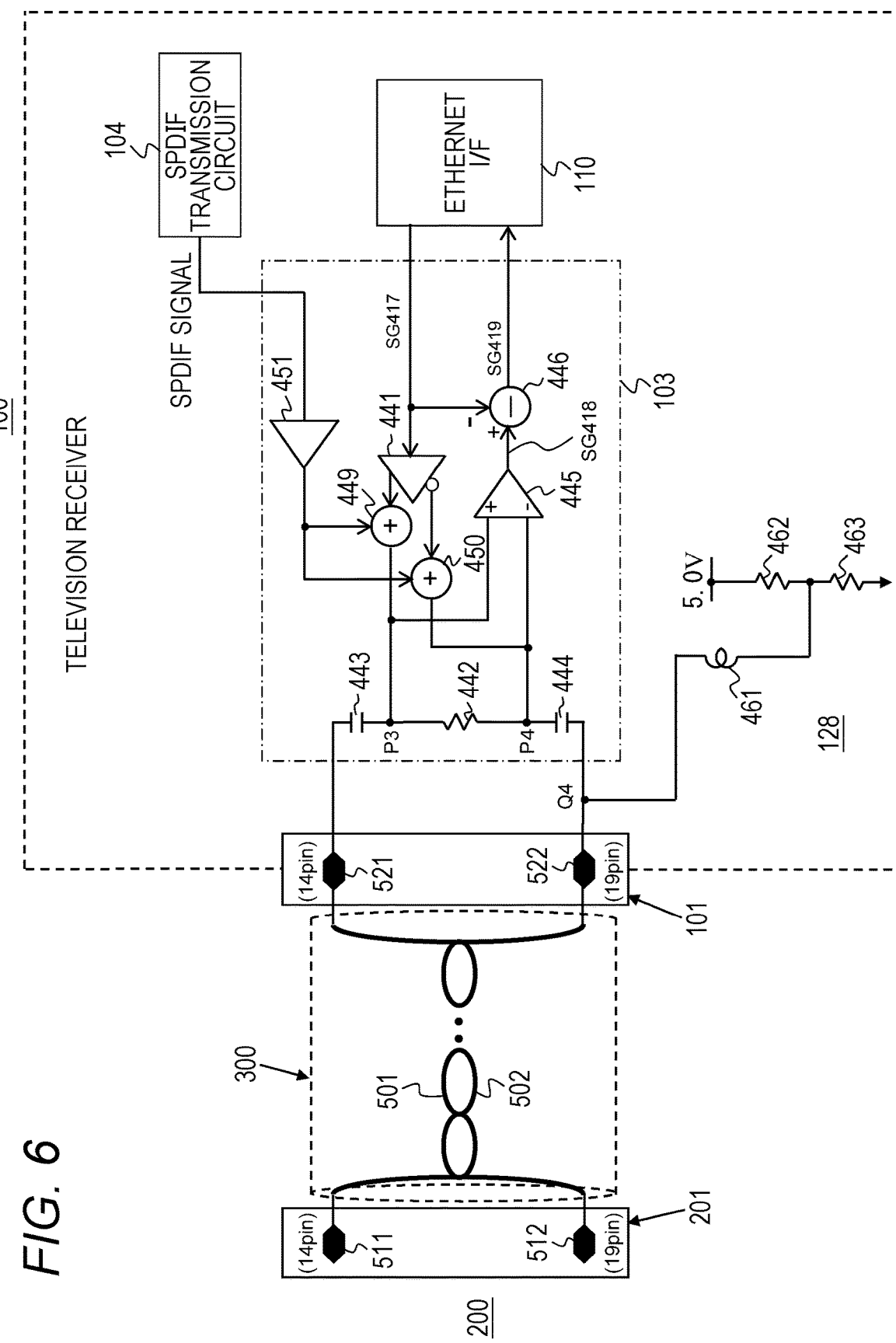
FIG. 6 is a diagram illustrating a configuration example of a high-speed bus interface of the television receiver.

FIG. 6 illustrates a configuration example of the high-speed bus interface 103 of the television receiver 100 in the AV system 10 of FIG. 1. The Ethernet interface 110 performs local area network (LAN) communication, that is, the transmission or reception of an Ethernet signal, by using a transmission line that is configured by a pair of lines, the reserve line and the HPD line, from among a plurality of lines that configures the HDMI cable 300. The SPDIF transmission circuit 104 transmits an SPDIF signal by using the transmission line that is configured by the pair of lines described above.

The television receiver 100 includes a LAN signal transmission circuit 441, a terminating resistor 442, AC coupling capacitances 443 and 444, a LAN signal reception circuit 445, a subtraction circuit 446, addition circuits 449 and 450, and an amplifier 451. These configure the high-speed bus interface 103. Furthermore, the television receiver 100 includes a choke coil 461, a resistor 462, and a resistor 463 that configure a plug connection transfer circuit 128.

Between a 14-pin terminal 521 and a 19-pin terminal 522 of the HDMI terminal 101, a series circuit of the AC coupling capacitance 443, the terminating resistor 442, and the AC coupling capacitance 444 is connected. Furthermore, between a power line (+5.0 V) and a grounding line, a series circuit of the resistor 462 and the resistor 463 is connected. Then, a mutual connecting point of these resistors 462 and 463 is connected to a connecting point Q4 of the 19-pin terminal 522 and the AC coupling capacitance 444 via the choke coil 461.

A mutual connecting point P3 of the AC coupling capacitance 443 and the terminating resistor 442 is connected to an output side of the addition circuit 449, and is also connected to a positive input side of the LAN signal reception circuit 445. Furthermore, a mutual connecting point P4 of the AC coupling capacitance 444 and the terminating resistor 442 is connected to an output side of the addition circuit 450, and is also connected to a negative input side of the LAN signal reception circuit 445.

One input side of the addition circuit 449 is connected to a positive output side of the LAN signal transmission circuit 441, and an SPDIF signal that has been output from the SPDIF transmission circuit 104 is supplied to another input side of this addition circuit 449 via the amplifier 451. Furthermore, one input side of the addition circuit 450 is connected to a negative output side of the LAN signal transmission circuit 441, and an SPDIF signal that has been output from the SPDIF transmission circuit 104 is supplied to another input side of this addition circuit 450 via the amplifier 451.

A transmission signal (transmission data) SG417 is supplied to an input side of the LAN signal transmission circuit 441 from the Ethernet interface 110. Furthermore, an output signal SG418 of the LAN signal reception circuit 445 is supplied to a positive-side terminal of the subtraction circuit 446, and a transmission signal SG417 is supplied to a negative-side terminal of this subtraction circuit 446. In this subtraction circuit 446, the transmission signal SG417 is subtracted from the output signal SG418 of the LAN signal reception circuit 445, and a reception signal (reception data) SG419 is obtained. In a case where a LAN signal (an Ethernet signal) is transmitted as a differential signal via the reserve line and the HPD line, this reception signal SG419 serves as the LAN signal. This reception signal SG419 is supplied to the Ethernet interface 110.

Figure 7:
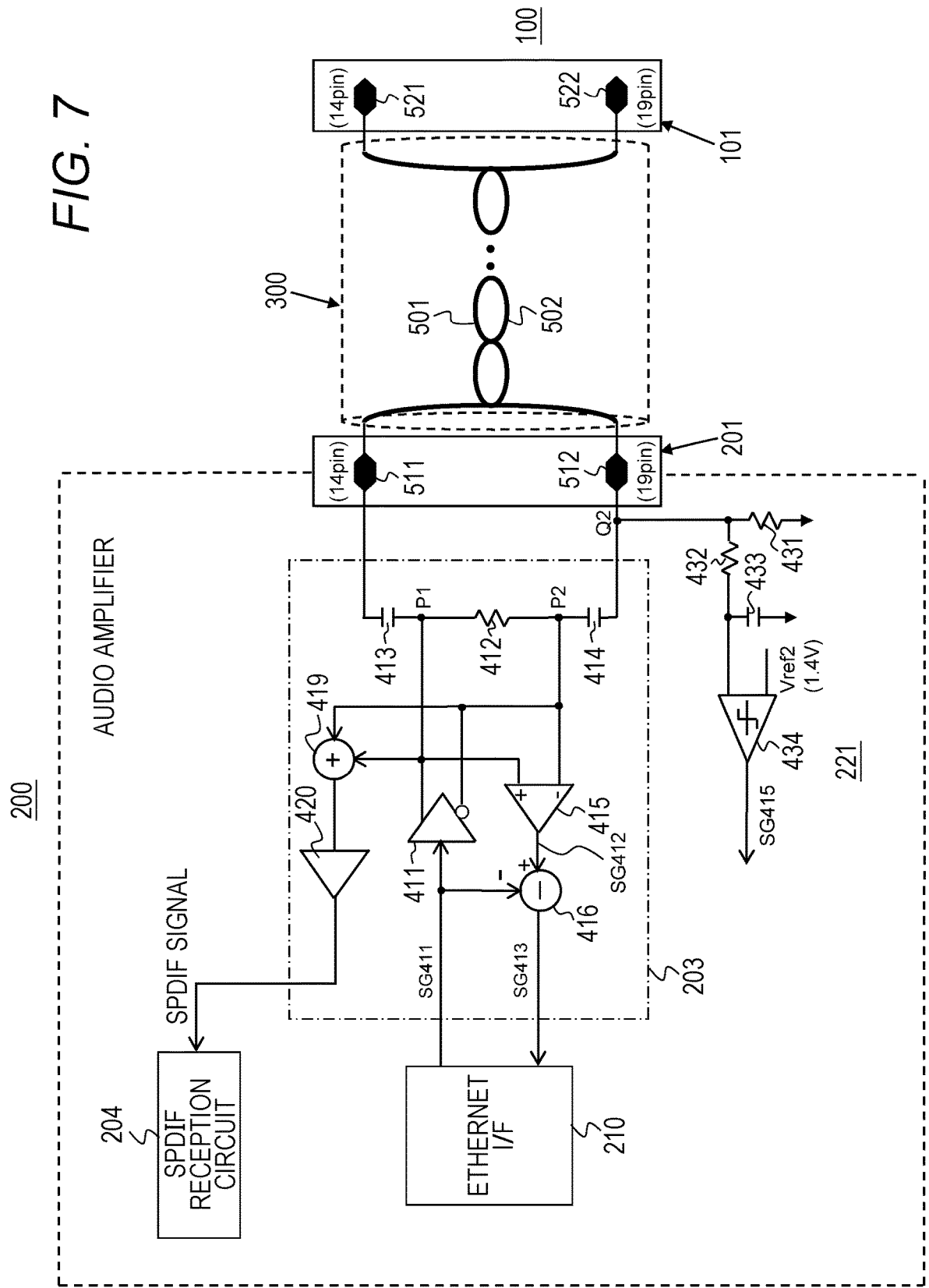
FIG. 7 is a diagram illustrating a configuration example of a high-speed bus interface of the audio amplifier.

FIG. 7 illustrates a configuration example of the high-speed bus interface 203 of the audio amplifier 200 in the AV system 10 of FIG. 1. The Ethernet interface 210 performs local area network (LAN) communication, that is, the transmission or reception of an Ethernet signal, by using a transmission line that is configured by a pair of lines, the reserve line and the HPD line, from among a plurality of lines that configures the HDMI cable 610. The SPDIF reception circuit 204 receives an SPDIF signal by using the transmission line that is configured by the pair of lines described above.

The audio amplifier 200 includes a LAN signal transmission circuit 411, a terminating resistor 412, AC coupling capacitances 413 and 414, a LAN signal reception circuit 415, a subtraction circuit 416, an addition circuit 419, and an amplifier 420. These configure the high-speed bus interface 203. Furthermore, the audio amplifier 200 includes a pull-down resistor 431, a resistor 432, a capacitance 433, and a comparator 434 that configure a plug connection detection circuit 221. Here, the resistor 432 and the capacitance 433 configure a low-pass filter.

Between a 14-pin terminal 511 and a 19-pin terminal 512 of the HDMI terminal 201, a series circuit of the AC coupling capacitance 413, the terminating resistor 412, and the AC coupling capacitance 414 is connected. A mutual connecting point P1 of the AC coupling capacitance 413 and the terminating resistor 412 is connected to a positive output side of the LAN signal transmission circuit 411, and is also connected to a positive input side of the LAN signal reception circuit 415.

A mutual connecting point P2 of the AC coupling capacitance 414 and the terminating resistor 412 is connected to a negative output side of the LAN signal transmission circuit 411, and is also connected to a negative input side of the LAN signal reception circuit 415. A transmission signal (transmission data) SG411 is supplied to an input side of the LAN signal transmission circuit 411 from the Ethernet interface 210.

An output signal SG412 of the LAN signal reception circuit 415 is supplied to a positive-side terminal of the subtraction circuit 416, and a transmission signal (transmission data) SG411 is supplied to a negative-side terminal of this subtraction circuit 416. In this subtraction circuit 416, the transmission signal SG411 is subtracted from the output signal SG412 of the LAN signal reception circuit 415, and a reception signal SG413 is obtained. In a case where a LAN signal (an Ethernet signal) is transmitted as a differential signal via the reserve line and the HPD line, this reception signal SG413 serves as the LAN signal. This reception signal SG413 is supplied to the Ethernet interface 210.

A connecting point Q2 of the AC coupling capacitance 414 and the 19-pin terminal 512 is connected to a grounding line via the pull-down resistor 431, and is also connected to a grounding line via a series circuit of the resistor 432 and the capacitance 433. Then, an output signal of the low-pass filter that has been obtained at a mutual connecting point of the resistor 432 and the capacitance 433 is supplied to one input terminal of the comparator 434. In this comparator 434, the output signal of the low-pass filter is compared with a reference voltage Vref2 (+1.4 V) that has been supplied to another input terminal. An output signal SG415 of this comparator 434 is supplied to a not-illustrated control unit (CPU) of the audio amplifier 200.

Furthermore, a mutual connecting point P1 of the AC coupling capacitance 413 and the terminating resistor 412 is connected to one input terminal of the addition circuit 419. Furthermore, a mutual connecting point P2 of the AC coupling capacitance 414 and the terminating resistor 412 is connected to another input terminal of the addition circuit 419. An output signal of this addition circuit 419 is supplied to the SPDIF reception circuit 204 via the amplifier 420. In a case where an SPDIF signal is transmitted as an in-phase signal via the reserve line and the HPD line, the output signal of this addition circuit 419 serves as the SPDIF signal.

"Details of SPDIF Signal"

Figure 8:
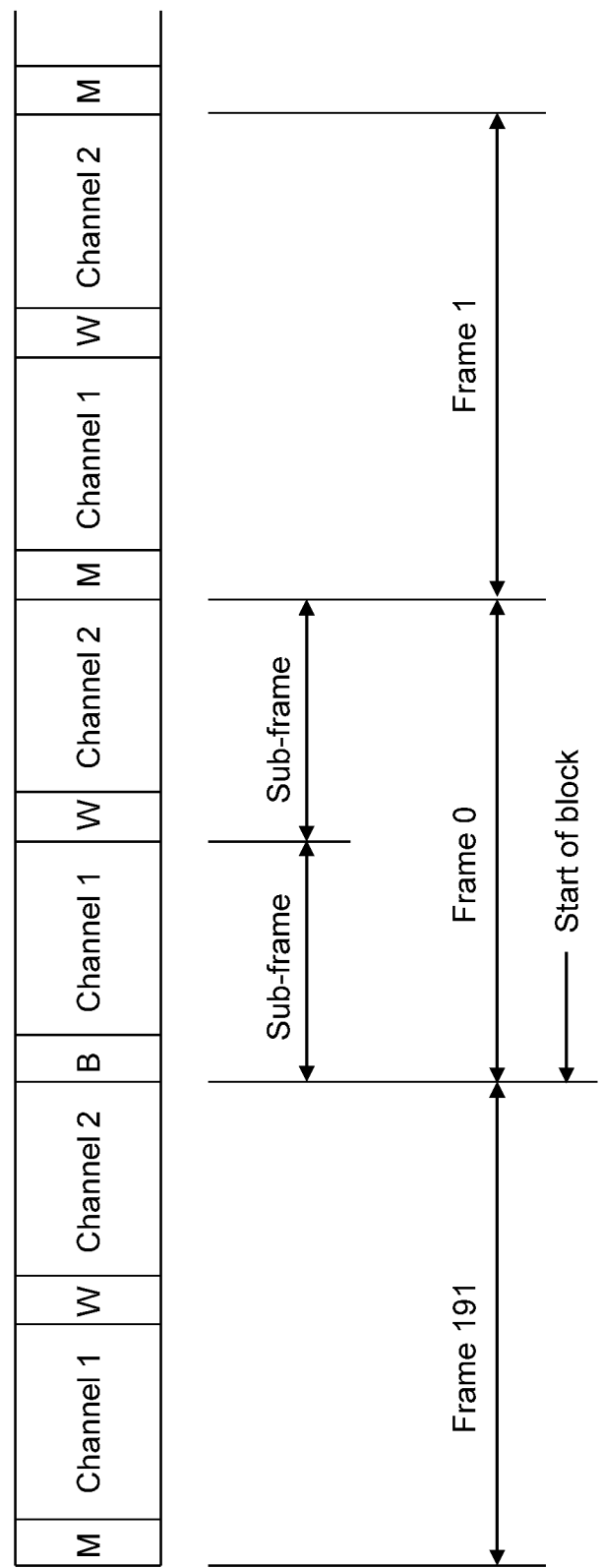
FIG. 8 is a diagram illustrating a frame configuration according to the IEC 60958 standard.

First, the outline of the IEC 60958 standard is described. FIG. 8 illustrates a frame configuration according to the IEC 60958 standard. Each frame is configured by two sub-frames. In the case of 2-channel stereo sound, a left-hand channel signal is included in a first sub-frame, and a right-hand channel signal is included in a second sub-frame.

At the head of a sub-frame, a preamble is provided, as described later, and "M" is given as a preamble to the left-hand channel signal, and "W" is given as a preamble to the right-hand channel signal. However, "B" indicating the start of a block is given to a first preamble every 192 frames. Stated another way, one block is configured by 192 frames. A block is a unit that configures the channel status described later.

Figure 9:
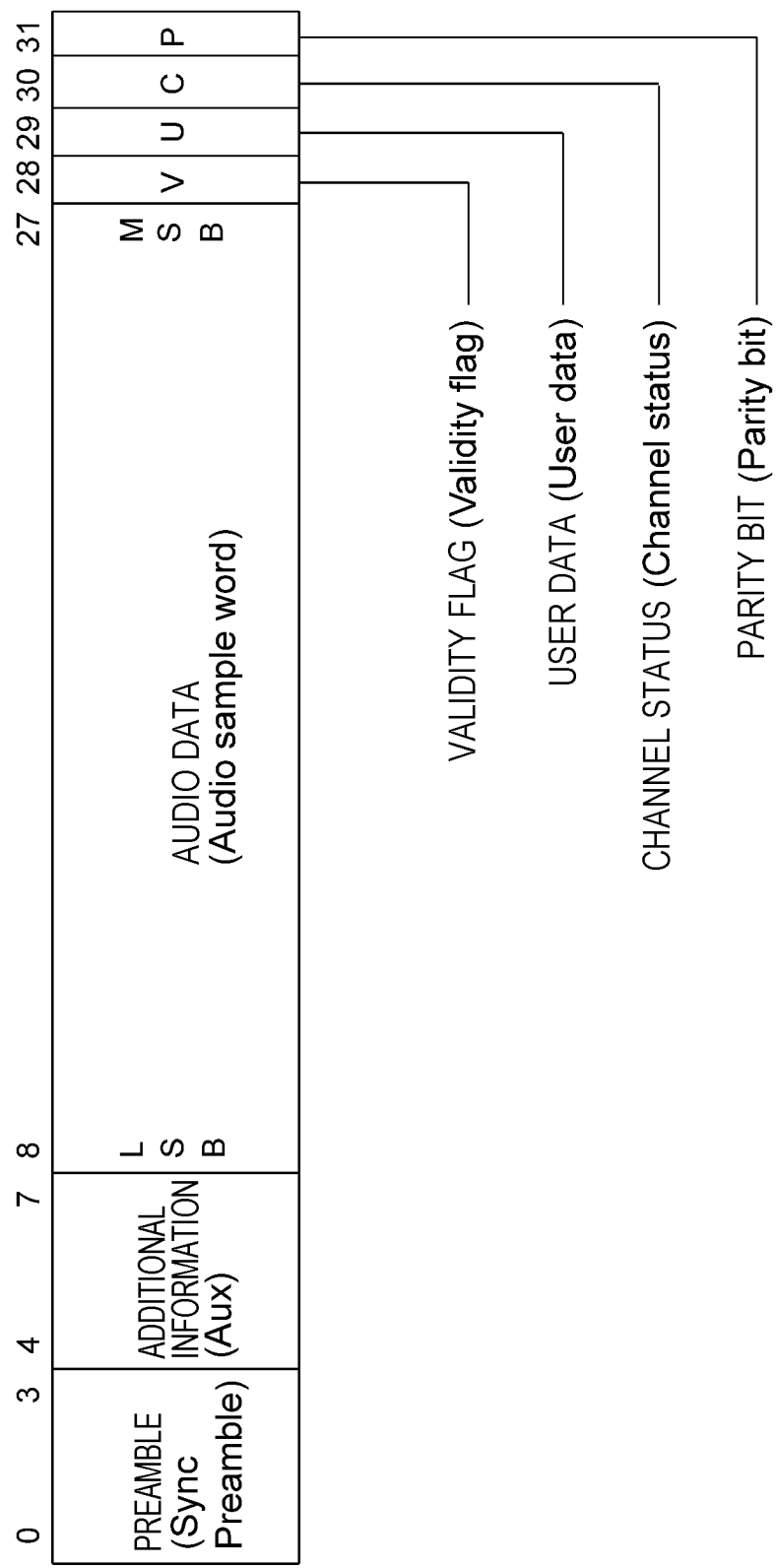
FIG. 9 is a diagram illustrating a sub-frame configuration according to the IEC 60958 standard.

FIG. 9 illustrates a sub-frame configuration according to the IEC 60958 standard. A sub-frame is configured by 32 time slots, 0th to 31st time slots. The 0th to 3rd time slots indicate a preamble (sync preamble). This preamble indicates any of "M", "W", and "B" in order to indicate a distinction between left-hand and right-hand channels or a start position of a block, as described above.

4th to 27th time slots are a main data field, and the entirety indicates audio data in a case where a 24-bit code range is employed. Furthermore, in a case where a 20-bit code range is employed, 8th to 27th time slots indicate audio data (audio sample word). In the latter case, 4th to 7th time slots can be used as additional information (auxiliary sample bits). The illustrated example indicates the latter case.

A 28th time slot is a validity flag of the main data field. A 29th time slot indicates one bit of user data. By accumulating this 29th time slot of each of the frames, a series of user data can be configured. A message of this user data is configured with 8-bit information unit (IU) as a unit, and one message includes 3 to 129 information units.

0 to 8 bits of "0" can exist between information units. The head of an information unit is identified by the start bit "1". In a message, first 7 information units are reserved, and a user can set arbitrary information in an 8th information unit and information units that follow. Messages are divided by 8 or more bits of "0".

A 30th time slot indicates one bit of a channel status. By accumulating the 30th time slot of each of the frames of each block, a series of channel status can be configured. Note that the head position of a block is indicated by the preamble "B" (the 0th to 3rd time slots), as described above.

A 31st time slot is a parity bit. This parity bit is given in such a way that the numbers of "0"s and "1"s that are included in the 4th to 31st time slots are even numbers.

Figure 10:
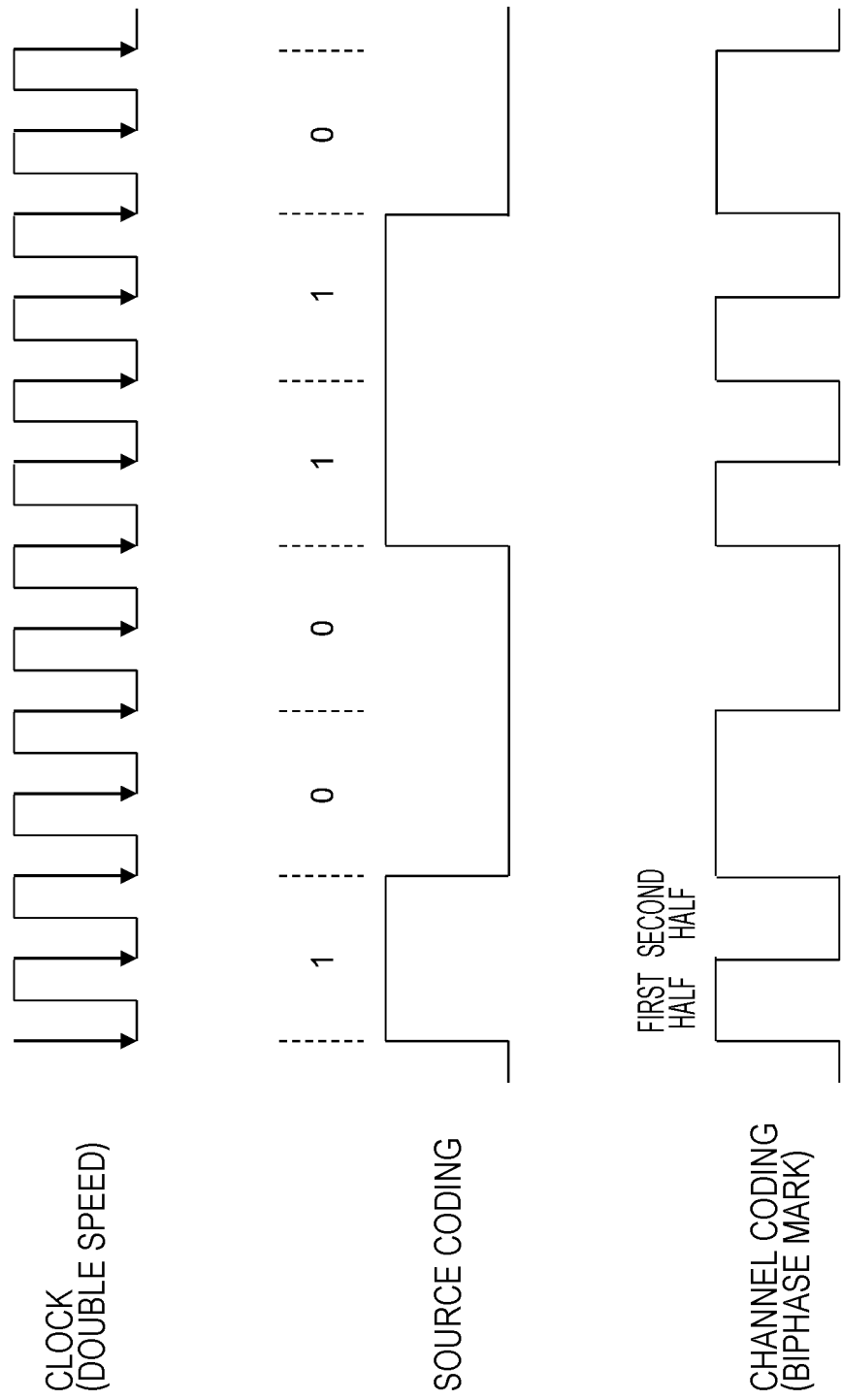
FIG. 10 is a diagram illustrating a signal modulation scheme according to the IEC 60958 standard.

FIG. 10 illustrates a signal modulation scheme according to the IEC 60958 standard. Biphase mark modulation is performed on 4th to 31st time slots obtained by excluding a preamble from a sub-frame. In this biphase mark modulation, a clock having twice the speed of an original signal (source coding) is used. When a clock cycle of an original signal is divided into a first half and a second half, an output of biphase mark modulation is always reversed at an edge of the first half of the clock cycle. Furthermore, at an edge of the second half of the clock cycle, the output is reversed when the original signal indicates "1", and the output is not reversed when the original signal indicates "0". Therefore, a clock component in the original signal can be extracted from a signal after biphase mark modulation.

FIG. 11 illustrates channel coding of a preamble according to the IEC 60958 standard. As described above, biphase mark modulation is performed on 4th to 31st time slots of a sub-frame. On the other hand, normal biphase mark modulation is not performed on a preamble of 0th to 3rd time slots, and the preamble is treated as a bit pattern that is synchronized with a double-speed clock. Stated another way, by allocating two bits to each time slot of the 0th to 3rd time slots, an 8-bit pattern, as illustrated, is obtained.

If the most recent state is "0", "11101000" is allocated to the preamble "B", "11100010" is allocated to "M", and "1100100" is allocated to "W". In contrast, if the most recent state is "1", "00010111" is allocated to the preamble "B", "00011101" is allocated to "M", and "00011011" is allocated to "W".

Figure 12:
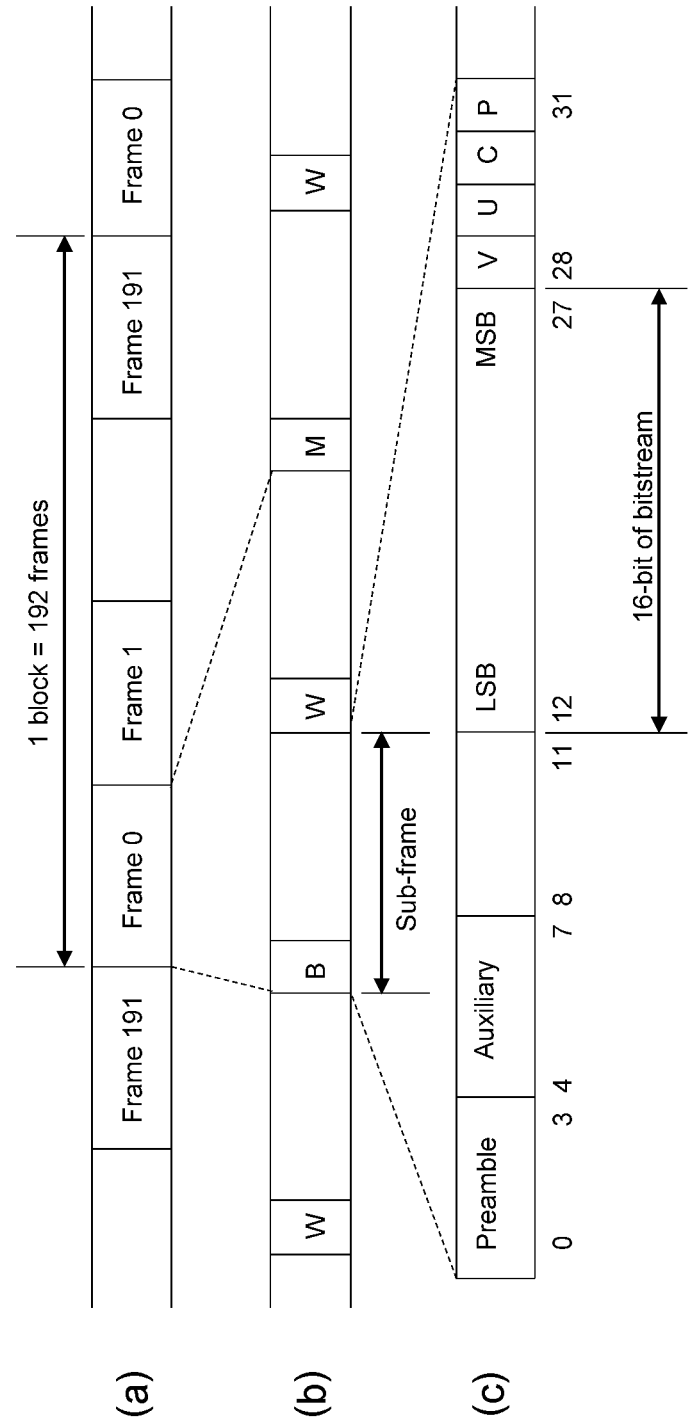
FIG. 12 is a diagram illustrating the IEC 61937-1 interface format.

A format of transmitting a compressed audio signal on a protocol according to the IEC 60958 standard is specified by the IEC 61937-1 standard. FIG. 12 illustrates the IEC 61937-1 interface format. FIG. 12(*a*) illustrates a frame configuration. 192 frames configure one block, and the blocks are consecutive. FIG. 12(*b*) illustrates that each of the frames includes two sub-frames.

A preamble is provided at the head of a sub-frame, and "B" indicating the start of a block is given to a preamble of a first sub-frame of a block. Then, "W" and "M" are alternately given to first preambles of respective sub-frames that follow.

FIG. 12(c) illustrates a sub-frame configuration. In the case of an SPDIF signal including compressed audio signals of a predetermined number of channels, a bit stream of a compressed audio signal is divided and is sequentially inserted into 12th to 27th time slots of each sub-frame. Stated another way, in a 24-bit audio data area in 4th to 27th time slots of each of the sub-frames, higher-order 16 bits are used to transmit a compressed audio signal.

Figure 13:
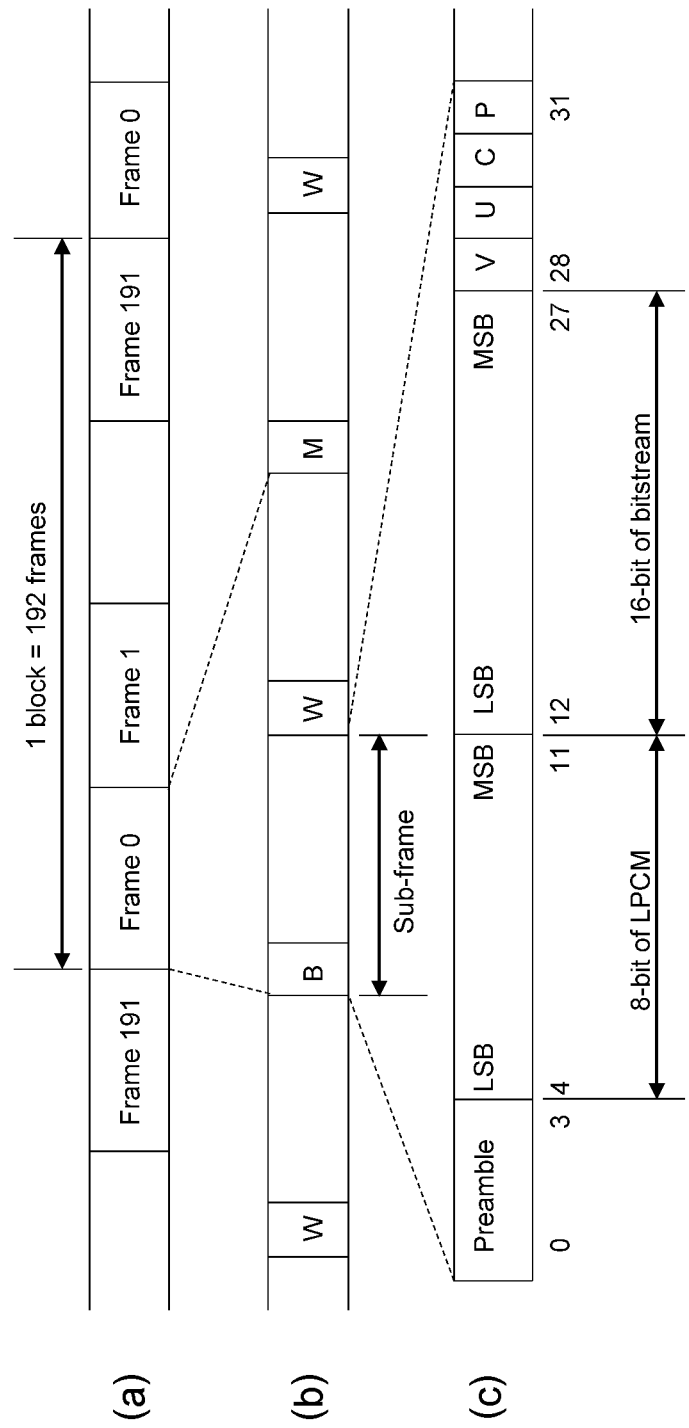
FIG. 13 is a diagram illustrating an interface format in a case where a compressed audio signal and a linear PCM signal are simultaneously transmitted.

In this embodiment, a compressed audio signal and a linear PCM signal are simultaneously transmitted. In this case, an audio signal of a sub-frame unit is a mixed signal of a compressed audio signal and a linear PCM signal. FIG. 13 illustrates an interface format in a case where a compressed audio signal and a linear PCM signal are simultaneously transmitted. FIGS. 13(a) and 13(b) are respectively the same as FIGS. 12(a) and 12(b). FIG. 13(c) illustrates a sub-frame configuration. In a 24-bit audio data area in 4th to 27th time slots of each of the sub-frames, higher-order 16 bits are used to transmit a compressed audio signal, and lower-order 8 bits are used to transmit a linear PCM signal.

As described above, identification information indicating that an audio signal of a sub-frame unit is a mixed signal of a compressed audio signal and a linear PCM signal and configuration information indicating the configuration of the linear PCM signal are added to an audio signal to be transmitted from this SPDIF transmission circuit 104. In this embodiment, these pieces of information are added by using a channel status bit.

FIG. 14 schematically illustrates a format of a channel status in a case where a compressed audio signal and a linear PCM signal are simultaneously transmitted. The entirety of a channel status includes 0th to 23rd bytes. 'a="0"' of a 0th bit indicates that this channel status is consumer use. Furthermore, 'b="1"' of a 1st bit indicates use in the transmission of a compressed digital audio signal, similarly to the IEC 61937-1 interface format.

Note that 3 bits, a 3rd bit to a 5th bit, are "000" in the conventional IEC 61937-1 interface format, and even if the same is applied, an operation is sufficiently performed. However, another value may be used for discrimination from the conventional IEC 61937-1 interface format. In the illustrated example, "100" is used.

4 bits, a 49th bit to a 52nd bit, are "0000" in the conventional IEC 61937-1 interface format. However, a value that is different from this is set, and serves as identification information indicating that an audio signal of a sub-frame unit is a mixed signal of a compressed audio signal and a linear PCM signal. In the illustrated example, "1111" is used. Furthermore, when these 4 bits, the 49th bit to the 52nd bit, indicate a mixed signal, 8 bits that follow, a 53rd bit to a 60th bit, are enabled.

These 8 bits are configuration information indicating the configuration of a linear PCM signal. FIG. 15 illustrates an example of a correspondence relationship between a value of a "multichannel configuration value (MCV)" and a configuration of a linear PCM signal for the 8 bits, the 53rd bit to the 60th bit. For example, "10000000" indicates "8-bit LPCM 2 channel", that is, a configuration of 8-bit 2 channels. Furthermore, for example, "01000000" indicates "8-bit LPCM Stereo 2 channel", that is, a configuration of 8-bit stereo 2 channels.

Furthermore, for example, "00100000" indicates "16-bit LPCM 1 channel", that is, a configuration of 16-bit 1 channel. Furthermore, for example, "10100000" indicates "16-bit LPCM 2 channel", that is, a configuration of 16-bit 2 channels. Furthermore, for example, "01100000" indicates "16-bit LPCM Stereo 2 channel", that is, a configuration of 16-bit stereo 2 channels. Furthermore, for example, "11100000" indicates "16-bit LPCM 4 channel", that is, a configuration of 16-bit 4 channels.

Figure 16:
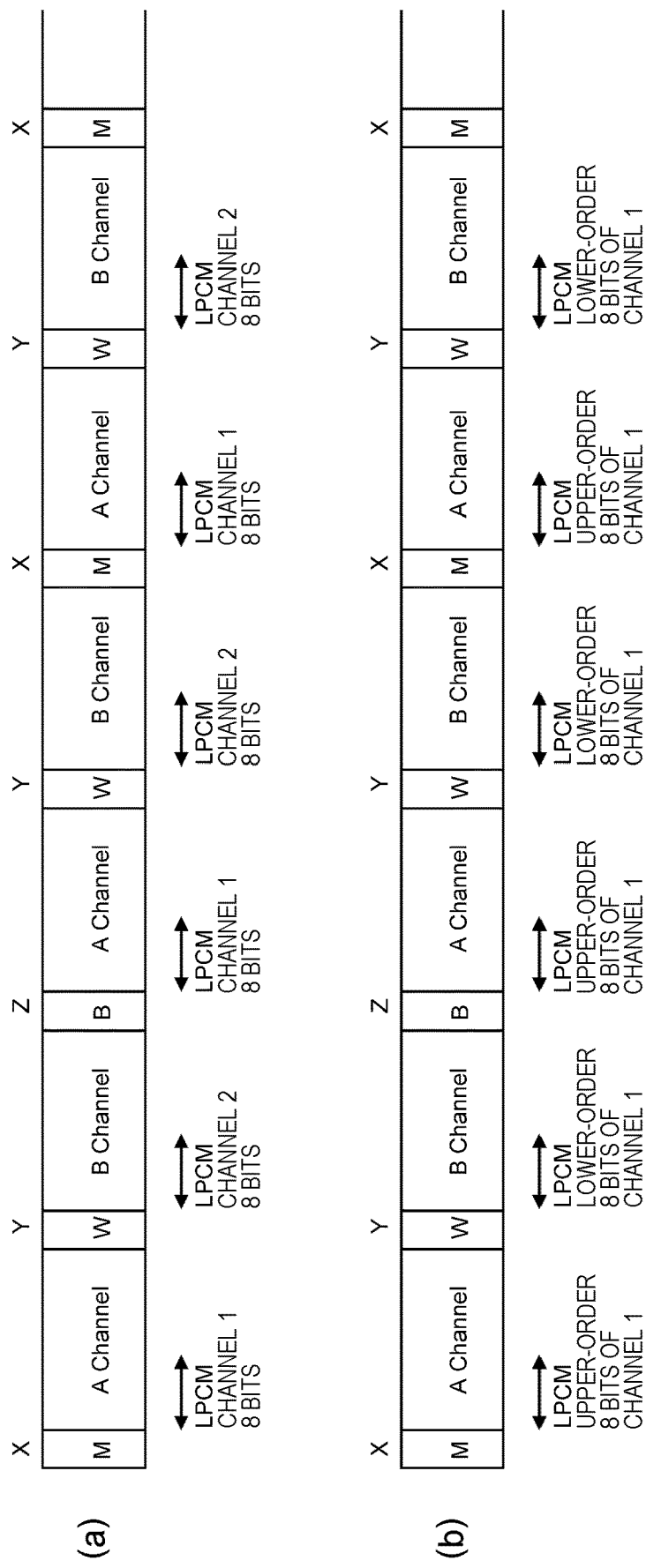
FIG. 16 is a diagram illustrating examples of frame configurations in the case of 8-bit 2 channels and the case of 16-bit 1 channel.

FIG. 16(a) illustrates an example of a frame configuration in the case of 8-bit 2 channels. In this case, an 8-bit linear PCM signal of Channel 1 is assigned to lower-order 8 bits of A channel, and an 8-bit linear PCM signal of Channel 2 is assigned to lower-order 8 bits of B channel.

FIG. 16(b) illustrates an example of a frame configuration in the case of 16-bit 1 channel. In this case, a higher-order 8-bit linear PCM signal of Channel 1 is assigned to lower-order 8 bits of A channel, and a lower-order 8-bit linear PCM signal of Channel 1 is assigned to lower-order 8 bits of B channel.

Figure 17:
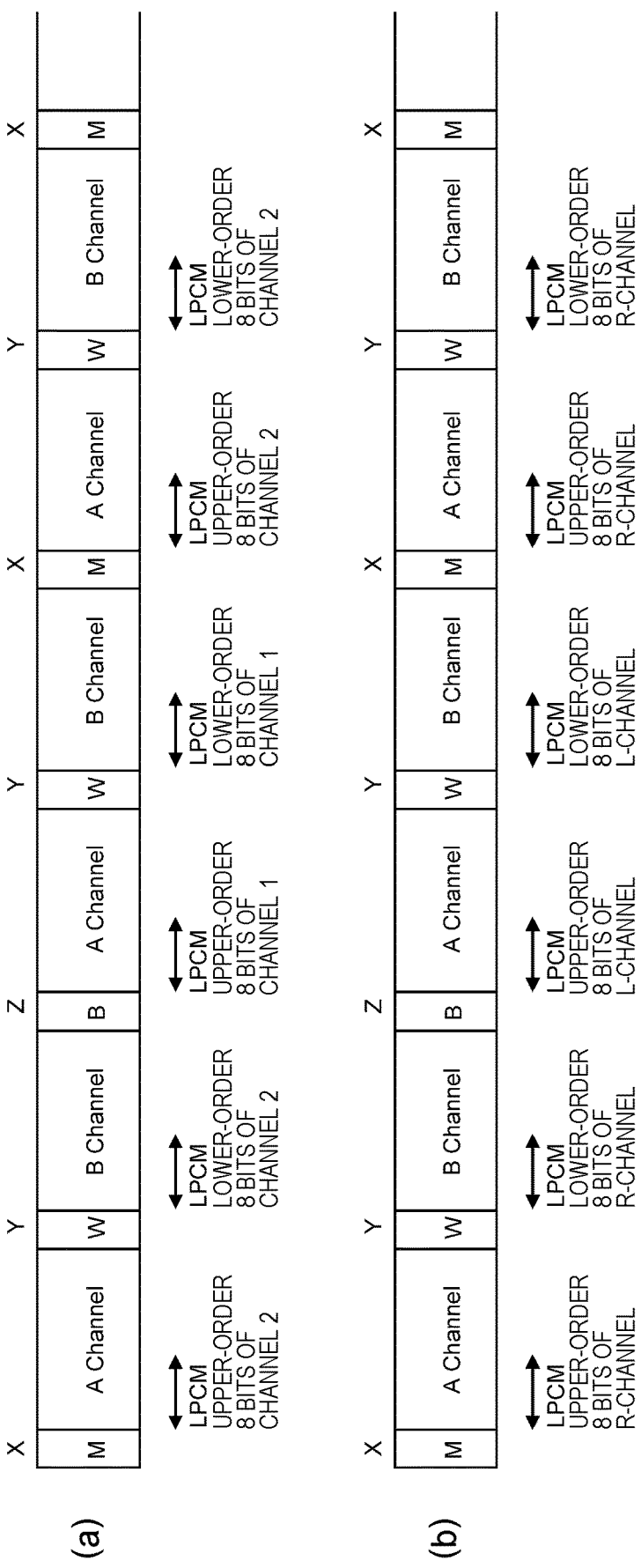
FIG. 17 is a diagram illustrating examples of frame configurations in the case of 16-bit 2 channels and the case of 16-bit stereo 2 channels.

FIG. 17(a) illustrates an example of a frame configuration in the case of 16-bit 2 channels. In a case where a transfer rate is increased twice, and, for example, in a case where an original sampling frequency is 48 kHz and a transfer rate is 96 kHz, the sampling frequency of a linear PCM signal is made to remain 48 kHz rather than 96 kHz.

In this case, counting from the start of a block, an upper-order 8-bit linear PCM signal of Channel 1 is assigned to lower-order 8 bits of an odd-numbered A-channel, a lower-order 8-bit linear PCM signal of Channel 1 is assigned to lower-order 8 bits of an odd-numbered B-channel, an upper-order 8-bit linear PCM signal of Channel 2 is assigned to lower-order 8 bits of an even-numbered A-channel, and a lower-order 8-bit linear PCM signal of Channel 2 is assigned to lower-order 8 bits of an odd-numbered B-channel.

FIG. 17(b) illustrates an example of a frame configuration in the case of 16-bit stereo 2 channels. In a case where a transfer rate is increased twice, and, for example, in a case where an original sampling frequency is 48 kHz and a transfer rate is 96 kHz, the sampling frequency of a linear PCM signal is made to remain 48 kHz rather than 96 kHz.

In this case, counting from the start of a block, an upper-order 8-bit linear PCM signal of L-channel is assigned to lower-order 8 bits of an odd-numbered A-channel, a lower-order 8-bit linear PCM signal of L-channel is assigned to lower-order 8 bits of an odd-numbered B-channel, an upper-order 8-bit linear PCM signal of R-channel is assigned to lower-order 8 bits of an even-numbered A-channel, and a lower-order 8-bit linear PCM signal of R-channel is assigned to lower-order 8 bits of an odd-numbered B-channel.

Furthermore, illustration is omitted, but in a frame configuration in the case of 16-bit 4 channels, a transfer rate is increased 4 times, and linear PCM signals of 4 channels are assigned. Furthermore, detailed description is omitted, but, similarly, the number of channels can be increased, or a bit depth can be set to 32 bits. Moreover, a linear PCM signal of 5.1 channels or the like can be transmitted.

FIG. 18 illustrates an example of a frame configuration in a case where a stereo 2-channel linear PCM signal and a 5.1-channel linear PCM signal are transmitted. In this case, counting from the start of a block, a stereo 2-channel linear PCM signal is assigned to a first one pair of A-channel and B-channel, a 5.1-channel linear PCM signal is assigned to three pairs of A-channel and B-channel that follow, and then, this is repeated.

As described above, various types of information that relate to a linear PCM signal are added to an audio signal to be transmitted from the SPDIF transmission circuit 104. In this embodiment, these pieces of information are added by using a user bit.

FIG. 19 illustrates an example of a user data message. This user data message is configured by 10 information units (IUs). Information of "IEC 61937-1 ID", that is, identification information indicating the type of information, is arranged in a 4th bit to a 0th bit of a 2nd IU and a 5th bit to a 2nd bit of a 3rd IU. Then, an information field of 4 bytes is provided in a 1st bit to a 0th bit of the 3rd IU and a 5th bit to a 0th bit of 4th to 8th IUs. Note that information field is not limited to information field of 4 bytes.

FIG. 20 illustrates an example of information. For example, in a case where "IEC 61937-1 ID" is "10000000", this indicates language information of sound indicated by a linear PCM signal. In this case, ASCII character information indicating an abbreviation of a language name is arranged in the information field of 4 bytes. Furthermore, for example, in a case where "IEC 61937-1 ID" is "01000000", this indicates information of a reproduction speaker position of sound indicated by a linear PCM signal. In this case, information indicating a channel number, an angle, a height, and a distance is arranged in the information field of 4 bytes. Note that the pieces of information described here are merely examples, and are not restrictive. By using the user data message, as illustrated in FIG. 19, various types of information relating to a linear PCM signal can be transmitted to a reception side.

As described above, in the AV system 10 illustrated in FIG. 1, a mixed signal of a compressed audio signal and a linear PCM signal can be transmitted in sub-frame units from the television receiver 100 to the audio player 200. Therefore, the television receiver 100 can satisfactorily achieve the simultaneous transmission of a compressed audio signal and a linear PCM signal, and the audio player 200 can satisfactorily achieve the simultaneous reproduction of a compressed audio signal and a linear PCM signal.

Furthermore, in the AV system 10 illustrated in FIG. 1, for example, when a 5.1-channel surround system is enjoyed in the audio amplifier 200 while an image of broadcast content is viewed in the television receiver 100, the following can be performed. (1) Reporting sound reporting the reception of an email can be reproduced. (2) Operation sound of the user interface 106 can be reproduced. (3) Sound into which subtitles data has been converted can be reproduced. (4) Languages of reproduced sound can be switched in the audio amplifier 200, and a language name can be displayed on the display unit 209 of the audio amplifier 200. (5) Sound indicated by a linear PCM signal can be reproduced, and its localization can be changed on the basis of speaker positional information.

2. Variations

Note that, in the embodiment described above, in a case where sound indicated by a compressed audio signal is in a first language and sound indicated by a linear PCM signal is in a second language, languages can be switched according to an operation performed on the audio amplifier 200 by a user. However, it is also conceivable that this switching operation can be performed from a side of the television receiver 100.

Figure 21:
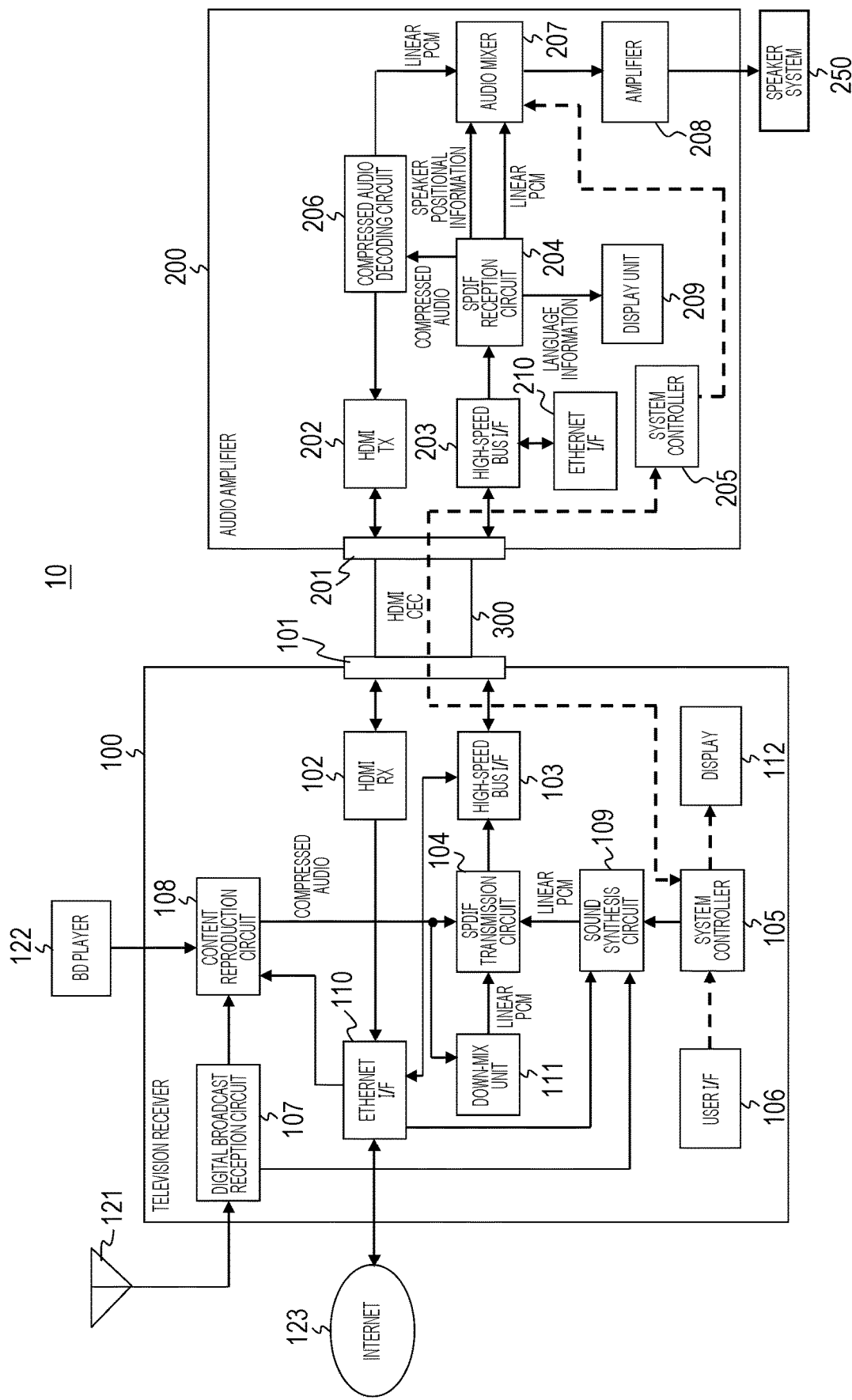
FIG. 21 is a diagram for explaining an operation in a case where a sound (language) switching operation is performed from a television receiver side.

FIG. 21 is a diagram for explaining an operation in this case, and a route relating to this operation is illustrated with a broken line. In FIG. 21, a portion that corresponds to FIG. 1 is illustrated by using the same reference signs. First, a user performs a sound switching operation by using the user interface 106, such as a remote controller, of the television receiver 100. In response to this, the system controller 105 of the television receiver 100 transmits a sound switching command to the system controller 205 of the audio amplifier 200 via the CEC line of the HDMI cable 300.

The system controller 205 of the audio amplifier 200 controls the audio mixer 207 on the basis of the sound switching command to switch sound, and reports the completion of sound switching to the system controller 105 of the television receiver 100 via the CEC line of the HDMI cable 300. The system controller 105 of the television receiver 100 displays, on the display 112, the name of a language after switching on the display 112, on the basis of this report.

Figure 22:
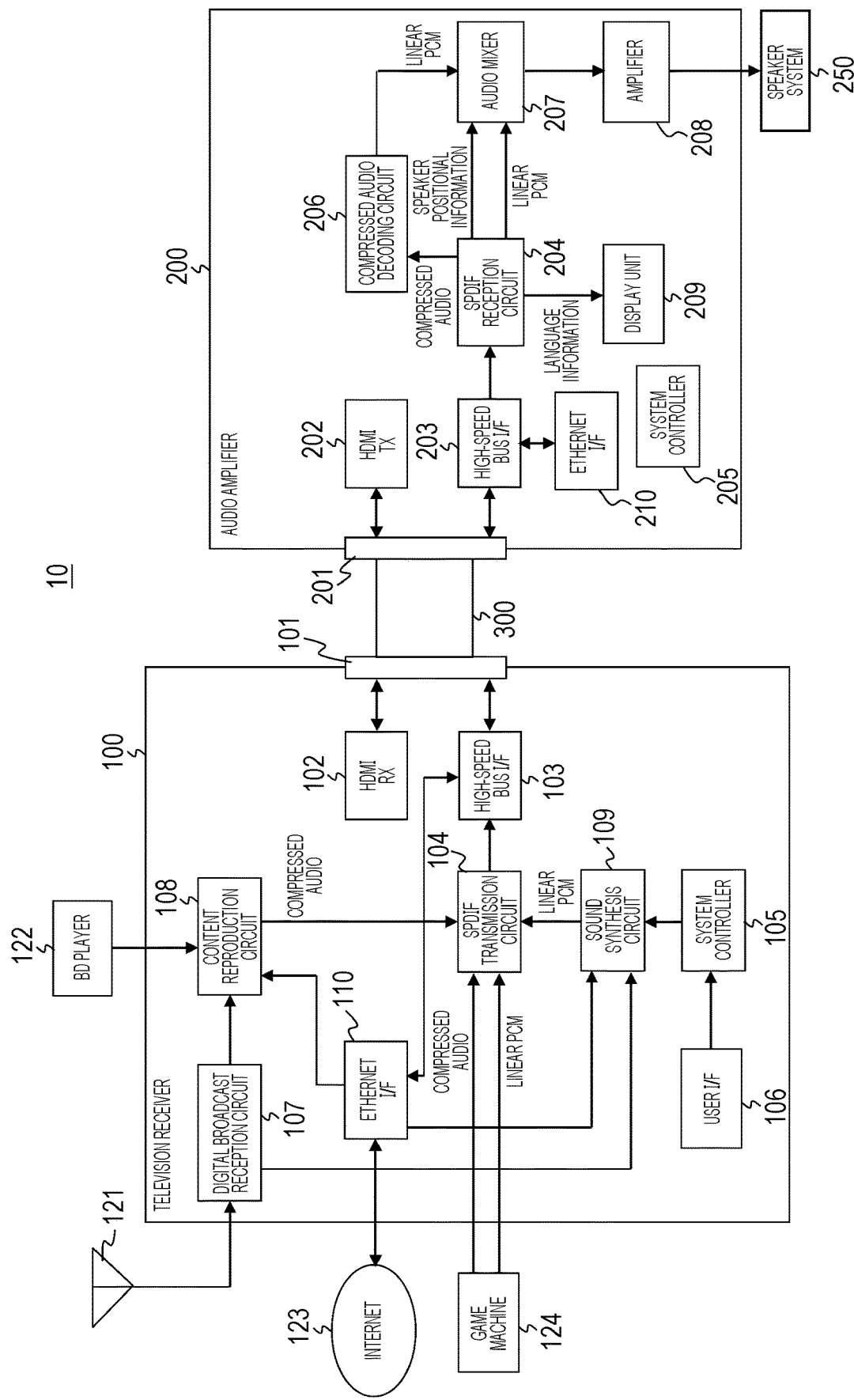
FIG. 22 is a block diagram illustrating a configuration example in a case where a game machine is connected to the television receiver and a game is played.

FIG. 22 illustrates a configuration example in a case where a game machine 124 is connected to the television receiver 100 and a game is played. In FIG. 22, a portion that corresponds to FIG. 1 is illustrated by using the same reference signs. In this case, a compressed audio signal of a soundtrack is output from the game machine 124, and a linear PCM signal of real-time response sound of a game controller is also output. The multi-channel compressed audio signal and the linear PCM signal that are described above are supplied to the SPDIF transmission circuit 104, and are simultaneously transmitted to the audio amplifier 200. In the audio amplifier 200, the soundtrack and the real-time response sound are simultaneously reproduced.

Note that a case is also conceivable where a linear PCM signal of a sound source that freely changes in localization is output from the game machine 124, this linear PCM signal is supplied to the SPDIF transmission circuit 104, and this linear PCM signal is transmitted to the audio amplifier 200 simultaneously with a compressed audio signal. In this case, by adding speaker positional information as information relating to the linear PCM signal, the audio mixer 207 of the audio amplifier 200 performs localization processing in real time.

Figure 23:
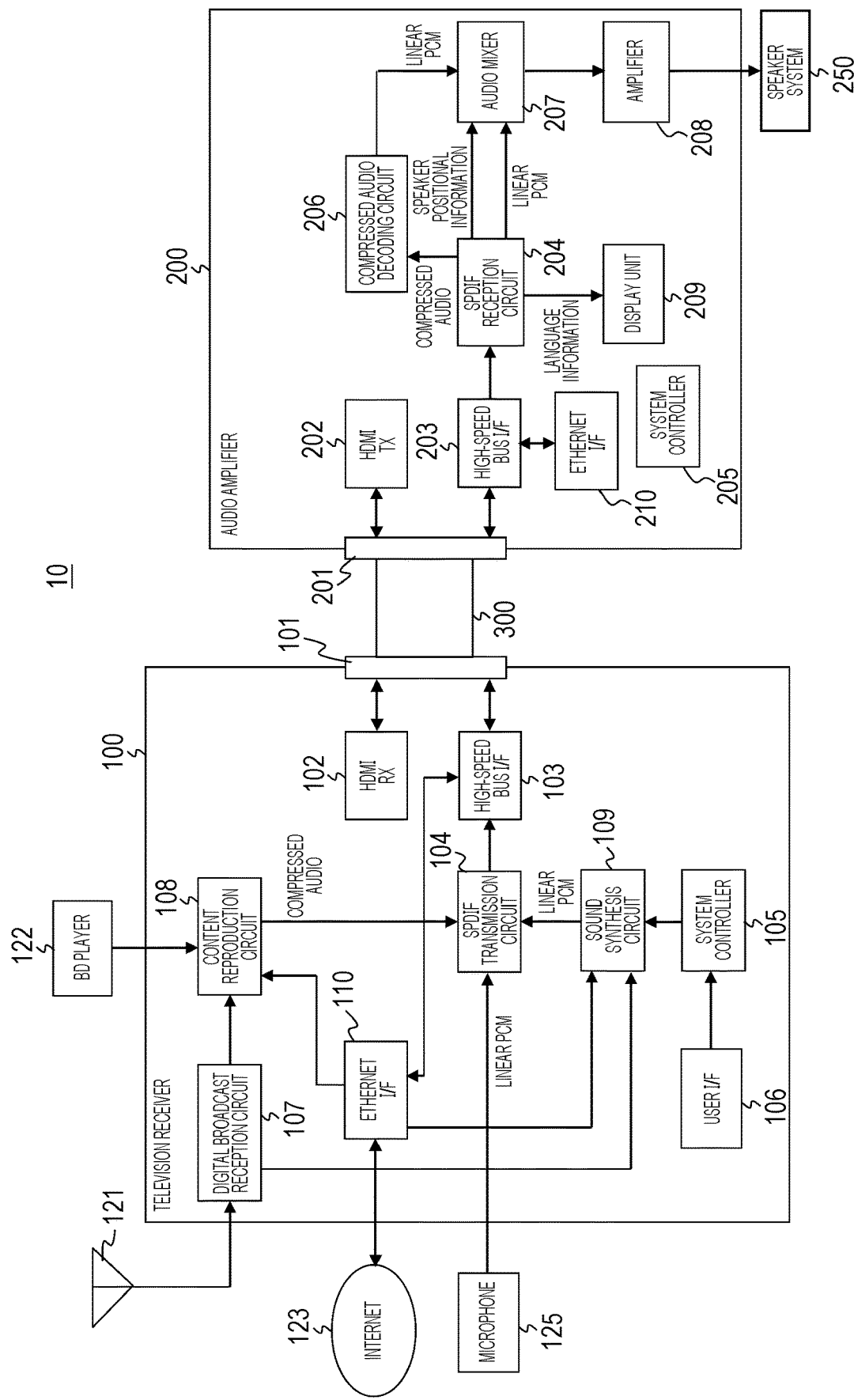
FIG. 23 is a block diagram illustrating a configuration example in a case where a microphone is connected to the television receiver and karaoke is performed.

FIG. 23 illustrates a configuration example in a case where a microphone 125 is connected to the television receiver 100 and karaoke is performed. In FIG. 23, a portion that corresponds to FIG. 1 is illustrated by using the same reference signs. In this case, a karaoke compressed audio signal is obtained, for example, from the BD player 122. Furthermore, a linear PCM signal that corresponds to a user's singing is obtained from the microphone 125. The karaoke compressed audio signal and the linear PCM signal from the microphone 125 are supplied to the SPDIF transmission circuit 104, and are simultaneously transmitted to the audio amplifier 200. In the audio amplifier 200, background performance sound and singing sound are simultaneously reproduced.

In this case, the background performance sound relates to the karaoke compressed audio signal, and in contrast, the singing sound relates to the linear PCM signal, and is provided in higher sound quality than the background performance sound. Therefore, there is an advantage in which the singing sound sounds skillful. Furthermore, the singing sound is transmitted in the linear PCM signal. Therefore, latency is small, and this facilitates singing.

In FIG. 24, the case of on-vehicle use is assumed, and FIG. 24 illustrates a configuration example in a case where a navigation system 126 is connected to the television receiver 100, and is used. In FIG. 24, a portion that corresponds to FIG. 1 is illustrated by using the same reference signs. In this case, a linear PCM signal of a sound guide from the navigation system 126 is supplied to the SPDIF transmission circuit 104, and is transmitted to the audio amplifier 200 simultaneously with a compressed audio signal. In the audio amplifier 200, reproduction is performed in such a way that navigation sound is superimposed in real time onto reproduced sound of broadcast content or reproduction content.

Note that detailed description is omitted, but the present technology can be further applied to a case where background sound and synthetic sound that changes in real time are separately and simultaneously transmitted in a VR/AR application. In this case, the background sound is transmitted as a compressed audio signal, and the synthetic sound is transmitted as a linear PCM signal. Furthermore, the present technology can also be applied to a case where, in health care, a motor control signal in each place of a massage chair is transmitted through a linear PCM channel while multi-channel music is reproduced in the massage chair. A DC level fails to be expressed in compression, but can be expressed in linear PCM.

Note that, in the embodiment described above, an example has been described in which HDMI ARC is used as an IEC 60958 transmission line, but an example is also conceivable in which a coaxial cable or an optical cable is used as the IEC 60958 transmission line. Furthermore, an example is also conceivable in which an HDMI transmission line is used as the IEC 60958 transmission line. In this case, an SPDIF signal (an IEC 60958 signal) is mapped in an audio sample packet, and is transmitted in a forward direction that is the same as a direction in video transmission. Similarly, an example is also conceivable in which an IEC 61883-6 transmission line, an MHL transmission line, a DisplayPort transmission line (a DP transmission line), or the like is used as the IEC 60958 transmission line. In these cases, similarly, an SPDIF signal (an IEC 60958 signal) is mapped in an audio sample packet, and is transmitted in a forward direction that is the same as a direction in video transmission.

Furthermore, a preferred embodiment of the present disclosure has been described in detail with reference to the attached drawings, but the technical scope of the present disclosure is not limited to the examples described above. It is obvious that a person with ordinary skill in the technical field of the present disclosure could conceive a variety of variations or modifications without departing from a technical idea described in the claims, and it should be understood that the variations or modifications fall under the technical scope of the present disclosure.

Furthermore, the technology can also employ the configuration described below.

(1) A transmission apparatus including:
a transmission unit that sequentially transmits an audio signal of a predetermined unit via a predetermined transmission line to a reception side,
in which the audio signal of the predetermined unit includes a mixed signal of a compressed audio signal and a linear PCM signal.

(2) The transmission apparatus described in (1) described above,
in which the audio signal of the predetermined unit includes an audio signal of a sub-frame unit.

(3) The transmission apparatus described in (2) described above,
in which, in the audio signal of the sub-frame unit, the compressed audio signal is arranged on an upper-order bit side, and the linear PCM signal is arranged on a lower-order bit side.

(4) The transmission apparatus described in any of (1) to (3) described above,
in which the linear PCM signal includes an audio signal that requires real-time property.

(5) The transmission apparatus described in any of (1) to (4) described above, further including:
an information addition unit that adds identification information to the audio signal to be transmitted by the transmission unit, the identification information indicating that the audio signal of the predetermined unit includes the mixed signal of the compressed audio signal and the linear PCM signal.

(6) The transmission apparatus described in (5) described above,
in which the information addition unit adds the identification information by using a predetermined bit area of a channel status of each block that is configured for a predetermined number of the predetermined units.

(7) The transmission apparatus described in any of (1) to (6) described above, further including:
an information addition unit that adds configuration information to the audio signal to be transmitted by the transmission unit, the configuration information indicating a configuration of the linear PCM signal.

(8) The transmission apparatus described in (7) described above,
in which the information addition unit adds the configuration information by using a predetermined bit area of a channel status of each block that is configured for a predetermined number of the predetermined units.

(9) The transmission apparatus described in any of (1) to (8) described above, further including:
an information addition unit that adds information relating to the linear PCM signal to the audio signal to be transmitted by the transmission unit.

(10) The transmission apparatus described in (9) described above,
in which the information addition unit adds the information relating to the linear PCM signal by using user data bits of a predetermined number of the predetermined units that are consecutive.

(11) The transmission apparatus described in any of (1) to (10) described above, further including:
a first acquisition unit that acquires the compressed audio signal; and a second acquisition unit that acquires the linear PCM signal.

(12) The transmission apparatus described in any of (1) to (11) described above,
in which the predetermined transmission line includes a coaxial cable, an optical cable, an Ethernet (IEC 61883-6) cable, an HDMI cable, an MHL cable, or a DisplayPort cable.

(13) A transmission method including:
a process of sequentially transmitting an audio signal of a predetermined unit via a predetermined transmission line to a reception side,
in which the audio signal of the predetermined sub-frame unit includes a mixed signal of a compressed audio signal and a linear PCM signal.

(14) A reception apparatus including:
a reception unit that sequentially receives an audio signal of a predetermined unit via a predetermined transmission line from a transmission side,
in which the audio signal of the predetermined unit includes a mixed signal of a compressed audio signal and a linear PCM signal.

(15) The reception apparatus described in (14) described above, further including:
a processing unit that processes the compressed audio signal and the linear PCM signal, and obtains an output linear PCM signal.

(16) The reception apparatus described in (15) described above,
in which configuration information has been added to the audio signal received by the reception unit, the configuration information indicating a configuration of the linear PCM signal, and
the processing unit processes the linear PCM signal on the basis of the configuration information.

(17) The reception apparatus described in (15) or (16) described above,
in which information relating to the linear PCM signal has been added to the audio signal received by the reception unit, and
the processing unit processes the linear PCM signal on the basis of the information relating to the linear PCM signal.

(18) A reception method including:
a process of sequentially receiving an audio signal of a predetermined unit via a predetermined transmission line from a transmission side,
in which the audio signal of the predetermined unit includes a mixed signal of a compressed audio signal and a linear PCM signal.

REFERENCE SIGNS LIST

10 AV system
100 Television receiver
101 HDMI terminal
102 HDMI reception unit
103 High-speed bus interface
104 SPDIF transmission circuit
105 System controller
106 User interface
107 Digital broadcast reception circuit
108 Content reproduction circuit
109 Sound synthesis circuit
110 Ethernet interface
111 Down-mix unit
112 Display
121 Reception antenna
122 BD player
123 Internet
124 Game machine
125 Microphone
126 Navigation system
200 Audio amplifier
201 HDMI terminal
202 HDMI transmission unit
203 High-speed bus interface
204 SPDIF reception circuit
205 System controller
206 Compressed audio decoding circuit
207 Audio mixer
208 Amplifier
209 Display unit
210 Ethernet interface
250 Speaker system
300 HDMI cable

The invention claimed is:
1. A reception method comprising:
a process of sequentially receiving an audio signal of a predetermined unit via a predetermined transmission line from a transmission side,
wherein the audio signal of the predetermined unit includes a mixed signal simultaneously received by mixing a compressed audio signal and a linear pulse code modulation (PCM) signal in each sub-frame of a plurality of sub-frames within at least one frame of the audio signal, and
wherein, following a preamble provided in each sub-frame, the compressed audio signal is arranged on an upper-order bit side, and the linear PCM signal is arranged on a lower-order bit side,
wherein identification information is added using a predetermined bit area of a channel status of each block that is configured for a predetermined number of the predetermined units, the identification information indicating that the audio signal of the predetermined unit includes the compressed audio signal and the linear PCM signal, and
wherein, in each sub-frame, the compressed audio signal is arranged on the upper-order bit side within 16 bits assigned to an area from a 12th bit to a 27th bit of the sub-frame and the linear PCM signal is arranged on the lower-order bit side within 8 bits assigned to an area from a 4th bit to an 11th bit of the sub-frame.

2. A transmission method comprising:
a process of sequentially transmitting an audio signal of a predetermined unit via a predetermined transmission line to a reception side,
wherein the audio signal of the predetermined unit includes a mixed signal simultaneously transmitted by mixing a compressed audio signal and a linear pulse code modulation (PCM) signal in each sub-frame of a plurality of sub-frames within at least one frame of the audio signal,
wherein, following a preamble provided in each sub-frame, the compressed audio signal is arranged on an upper-order bit side, and the linear PCM signal is arranged on a lower-order bit side,
wherein identification information is added using a predetermined bit area of a channel status of each block that is configured for a predetermined number of the predetermined units, the identification information indicating that the audio signal of the predetermined unit includes the compressed audio signal and the linear PCM signal, and
wherein, in each sub-frame, the compressed audio signal is arranged on the upper-order bit side within 16 bits assigned to an area from a 12th bit to a 27th bit of the sub-frame and the linear PCM signal is arranged on the lower-order bit side within 8 bits assigned to an area from a 4th bit to an 11th bit of the sub-frame.

3. A reception apparatus comprising:
a reception unit configured to sequentially receive an audio signal of a predetermined unit via a predetermined transmission line from a transmission side,
wherein the audio signal of the predetermined unit includes a mixed signal simultaneously received by mixing a compressed audio signal and a linear pulse code modulation (PCM) signal in each sub-frame of a plurality of sub-frames within at least one frame of the audio signal,
wherein, following a preamble provided in each sub-frame, the compressed audio signal is arranged on an upper-order bit side, and the linear PCM signal is arranged on a lower-order bit side, wherein identification information is added using a predetermined bit area of a channel status of each block that is configured for a predetermined number of the predetermined units, the identification information indicating that the audio signal of the predetermined unit includes the compressed audio signal and the linear PCM signal, wherein, in each sub-frame, the compressed audio signal is arranged on the upper-order bit side within 16 bits assigned to an area from a 12th bit to a 27th bit of the sub-frame and the linear PCM signal is arranged on the lower-order bit side within 8 bits assigned to an area from a 4th bit to an 11th bit of the sub-frame, and wherein the reception unit is implemented via at least one processor.

4. The reception apparatus according to claim 3, further comprising:

a processing unit configured to
process the compressed audio signal and the linear PCM signal, and
obtain an output linear PCM signal.

5. The reception apparatus according to claim 4, wherein configuration information has been added to the audio signal received by the reception unit, the configuration information indicating a configuration of the linear PCM signal, and the processing unit processes the linear PCM signal on a basis of the configuration information.

6. The reception apparatus according to claim 4, wherein information relating to the linear PCM signal has been added to the audio signal received by the reception unit, and the processing unit processes the linear PCM signal on a basis of the information relating to the linear PCM signal.

7. A transmission apparatus comprising:

a transmission unit configured to sequentially transmit an audio signal of a predetermined unit via a predetermined transmission line to a reception side, wherein the audio signal of the predetermined unit includes a mixed signal simultaneously transmitted by mixing a compressed audio signal and a linear pulse code modulation (PCM) signal in each sub-frame of a plurality of sub-frames within at least one frame of the audio signal, wherein, following a preamble provided in each sub-frame, the compressed audio signal is arranged on an upper-order bit side, and the linear PCM signal is arranged on a lower-order bit side, wherein identification information is added using a predetermined bit area of a channel status of each block that is configured for a predetermined number of the predetermined units, the identification information indicating that the audio signal of the predetermined unit includes the compressed audio signal and the linear PCM signal, wherein, in each sub-frame, the compressed audio signal is arranged on the upper-order bit side within 16 bits assigned to an area from a 12th bit to a 27th bit of the sub-frame and the linear PCM signal is arranged on the lower-order bit side within 8 bits assigned to an area from a 4th bit to an 11th bit of the sub-frame, and wherein the transmission unit is implemented via at least one processor.

8. The transmission apparatus according to claim 7, wherein the linear PCM signal includes an audio signal that requires real-time property.

9. The transmission apparatus according to claim 7, further comprising:

an information addition unit configured to add the identification information to the audio signal to be transmitted by the transmission unit, wherein the information addition unit is implemented via at least one processor.

10. The transmission apparatus according to claim 7, further comprising:

a first acquisition unit configured to acquire the compressed audio signal; and a second acquisition unit configured to acquire the linear PCM signal, wherein the first acquisition unit is implemented via at least one processor.

11. The transmission apparatus according to claim 7, wherein the predetermined transmission line includes at least one of a coaxial cable, an optical cable, an Ethernet (IEC 61883-6) cable, an HDMI cable, an MHL cable, or a DisplayPort cable.

12. The transmission apparatus according to claim 7, wherein an amount of data allocated to the linear PCM signal included within each sub-frame is determined based on a configuration of the linear PCM signal, and wherein the configuration of the linear PCM signal is indicated using a multichannel configuration value.

13. The transmission apparatus according to claim 7, further comprising:

an information addition unit configured to add configuration information to the audio signal to be transmitted by the transmission unit, the configuration information indicating a configuration of the linear PCM signal, wherein the information addition unit is implemented via at least one processor.

14. The transmission apparatus according to claim 13, wherein the information addition unit adds the configuration information by using a predetermined bit area of a channel status of each block that is configured for a predetermined number of the predetermined units.

15. The transmission apparatus according to claim 7, further comprising:

an information addition unit configured to add information relating to the linear PCM signal to the audio signal to be transmitted by the transmission unit, wherein the information addition unit is implemented via at least one processor.

16. The transmission apparatus according to claim 15, wherein the information addition unit adds the information relating to the linear PCM signal by using user data bits of a predetermined number of the predetermined units that are consecutive.

* * * * *